United States Patent
Kobayashi

(10) Patent No.: US 7,305,753 B2
(45) Date of Patent: Dec. 11, 2007

(54) METHOD FOR MANUFACTURING A MAGNETIC HEAD

(75) Inventor: Kiyoshi Kobayashi, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 334 days.

(21) Appl. No.: 11/051,094

(22) Filed: Feb. 4, 2005

(65) Prior Publication Data

US 2005/0185340 A1 Aug. 25, 2005

(30) Foreign Application Priority Data

Feb. 20, 2004 (JP) ............... 2004-043757

(51) Int. Cl.
*G11B 5/127* (2006.01)
*H04R 31/00* (2006.01)

(52) U.S. Cl. ............... 29/603.16; 29/603.13; 29/603.15; 29/603.18; 216/65; 360/122; 360/126; 360/317; 451/5; 451/41

(58) Field of Classification Search ............ 29/603.07, 29/603.11–603.16, 603.18; 216/65; 360/121, 360/122, 126, 317; 451/5, 41
See application file for complete search history.

(56) References Cited

U.S. PATENT DOCUMENTS 4,921,508 A * 5/1990 Nonaka .................. 29/603.15
6,055,137 A * 4/2000 Ishiwata et al. ........... 360/317
6,301,076 B1 * 10/2001 Stageberg et al. .......... 360/126
6,430,003 B1 * 8/2002 Sasaki ....................... 360/126

FOREIGN PATENT DOCUMENTS

| JP | 07-182620 | 7/1995 |
|---|---|---|
| JP | 07-272211 | 10/1995 |
| JP | 11-232609 | 8/1999 |
| JP | 2002-197610 | 7/2002 |
| WO | WO 00/077777 | 12/2000 |

OTHER PUBLICATIONS

Notification of Reasons for Refusal for corresponding Japenese Patent Application Serial No. 2004-043757, dated Jul. 24,2007.

* cited by examiner

*Primary Examiner*—Paul D. Kim
(74) *Attorney, Agent, or Firm*—Brinks Hofer Gilson & Lione

(57) ABSTRACT

A first magnetic layer is formed on a first magnetic layer formation surface, and then a first material layer-forming layer is deposited on the first magnetic layer formation surface and on the sides and the top of the first magnetic layer and is etched to form first material layers so that the width dimension of each first material layer in the track width direction gradually decreases in the upward direction. Then, a second material layer is formed over the first material layer formation surface, the first material layers, and the first magnetic layer. Then, the first material layers, the second material layer, and the first magnetic layer are polished to expose the upper surface of the first magnetic layer and form the upper surfaces of the second material layer and the first magnetic layer as the same planarized surface.

8 Claims, 15 Drawing Sheets

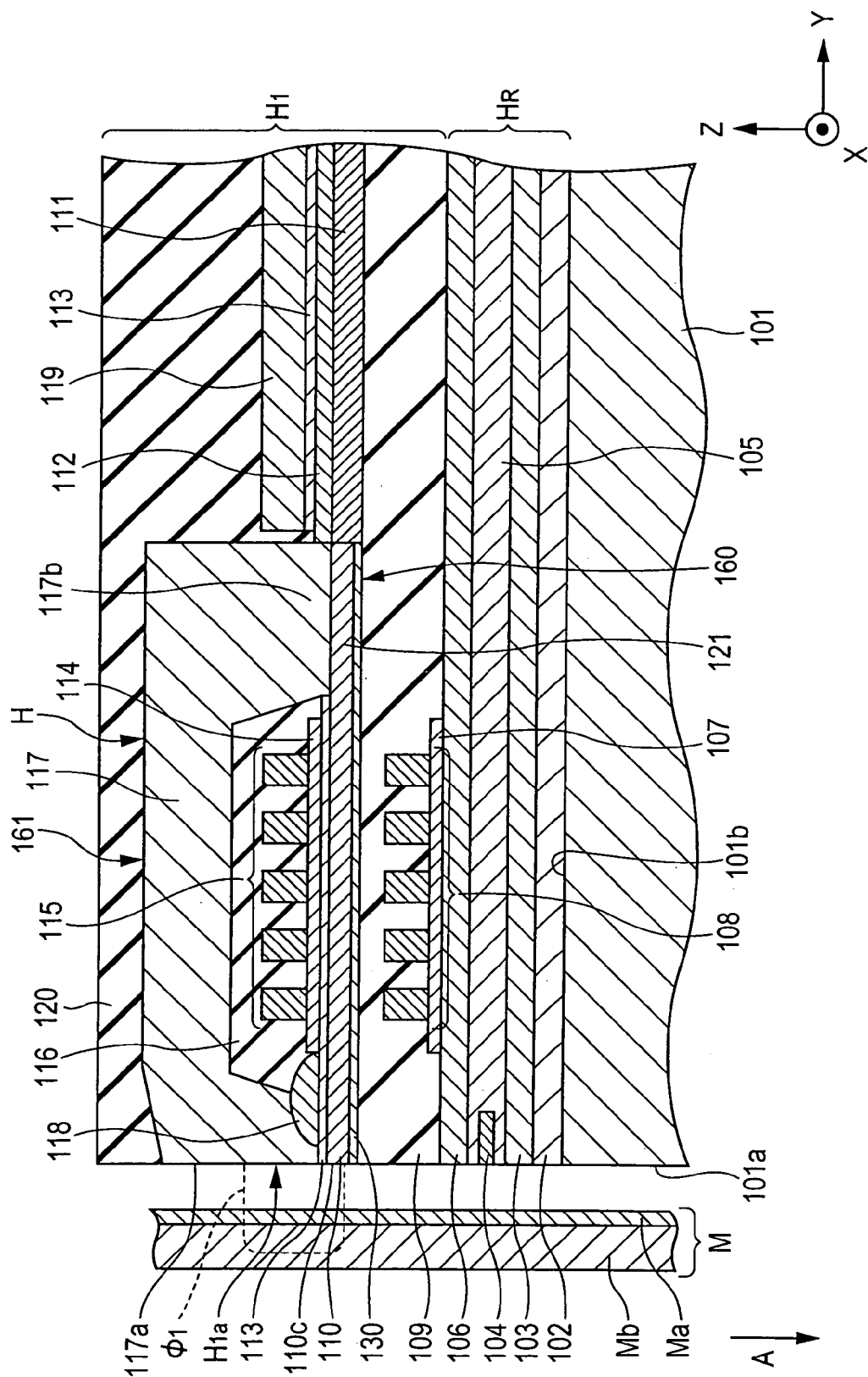

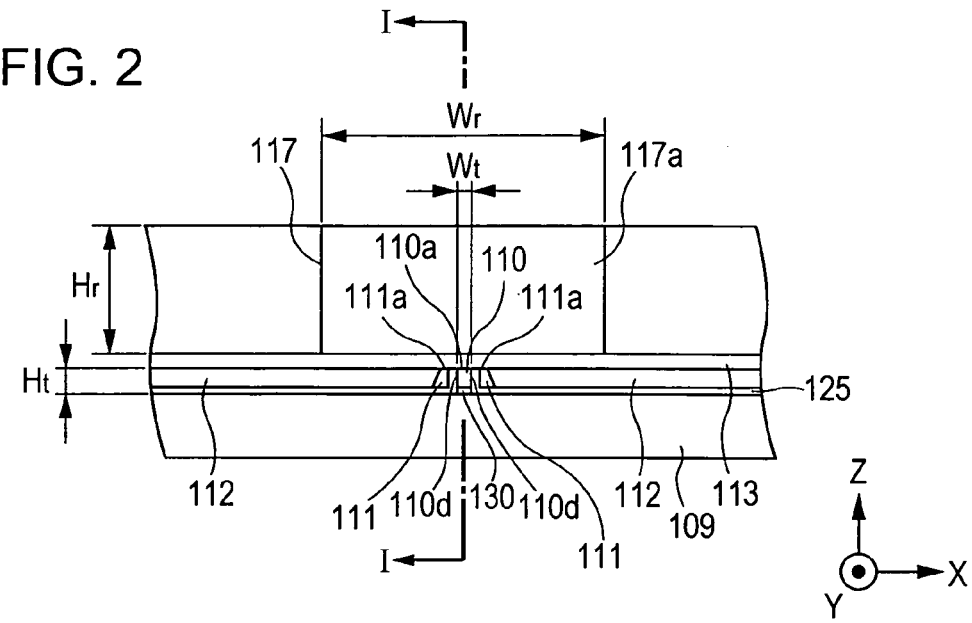
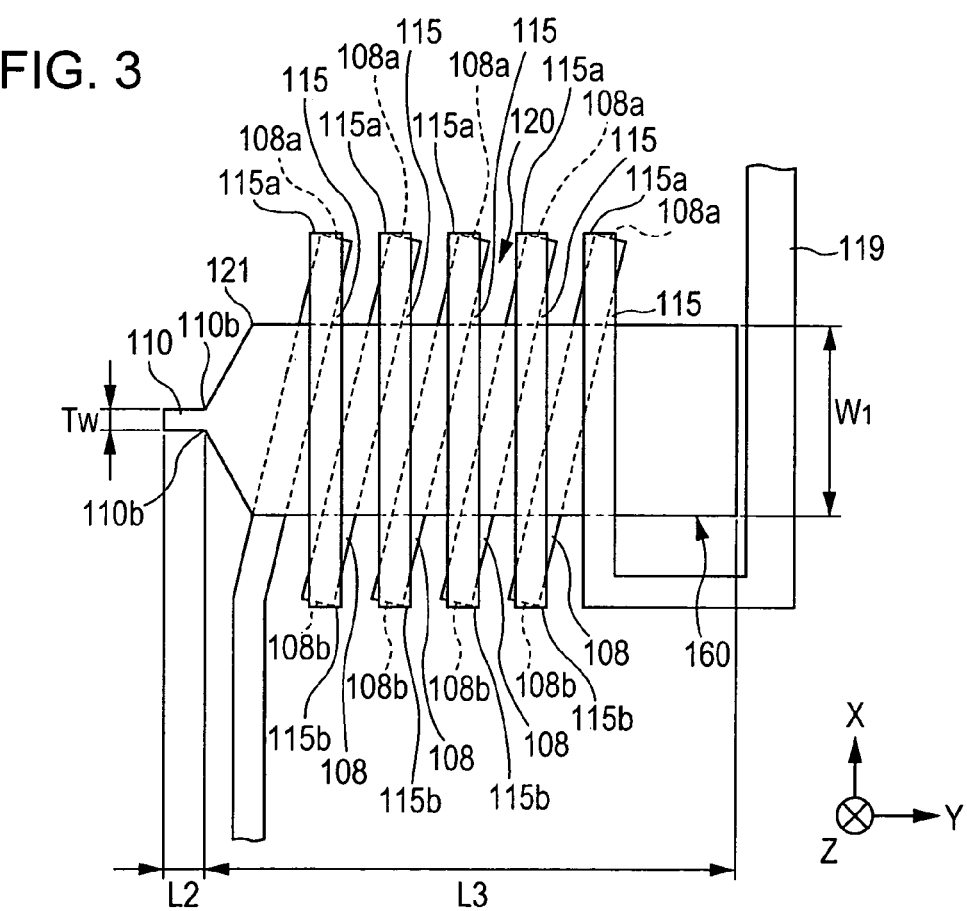

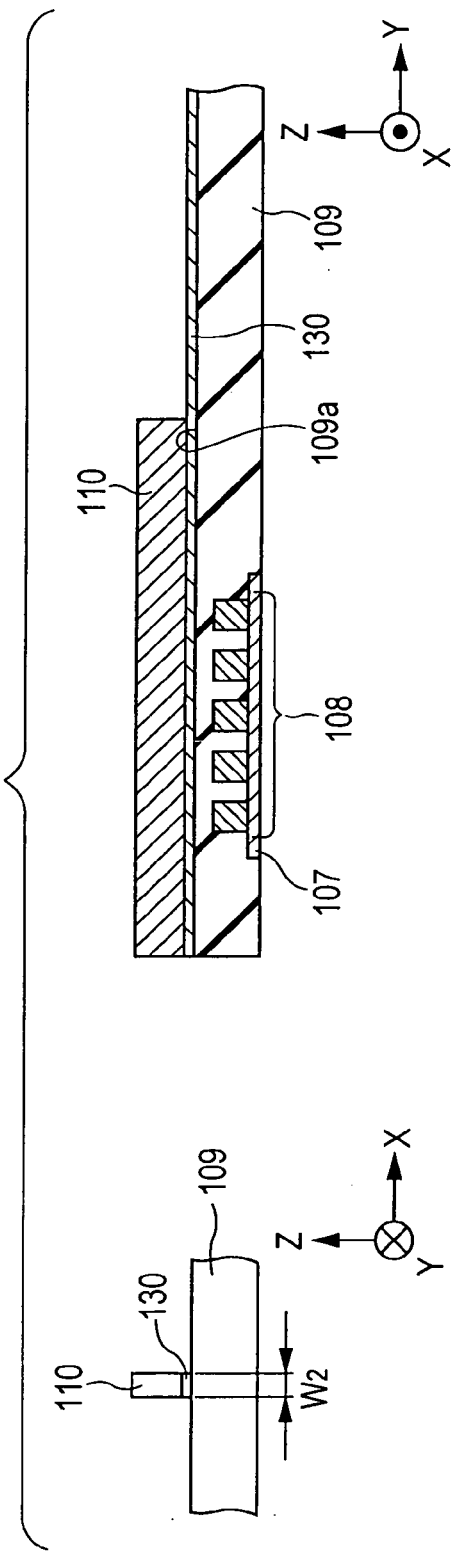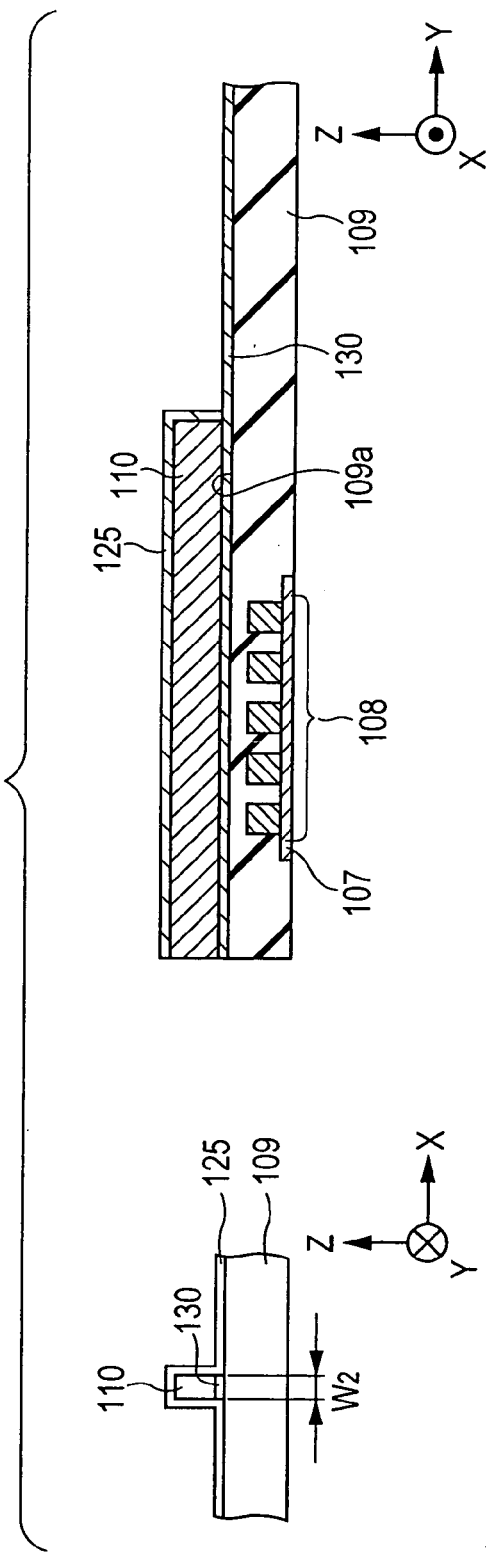

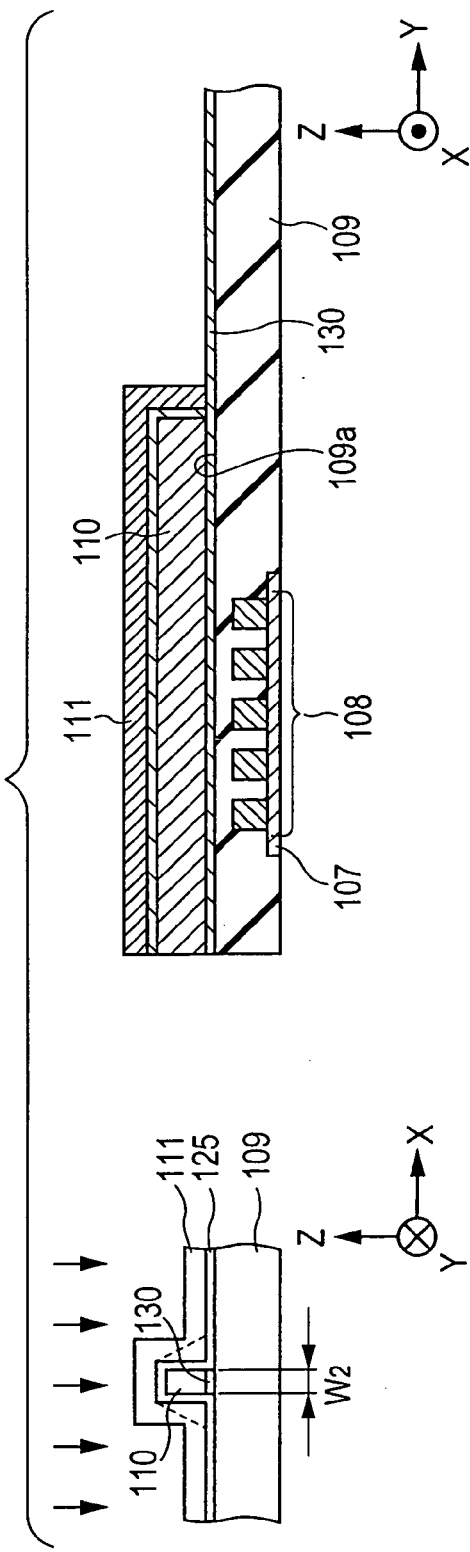
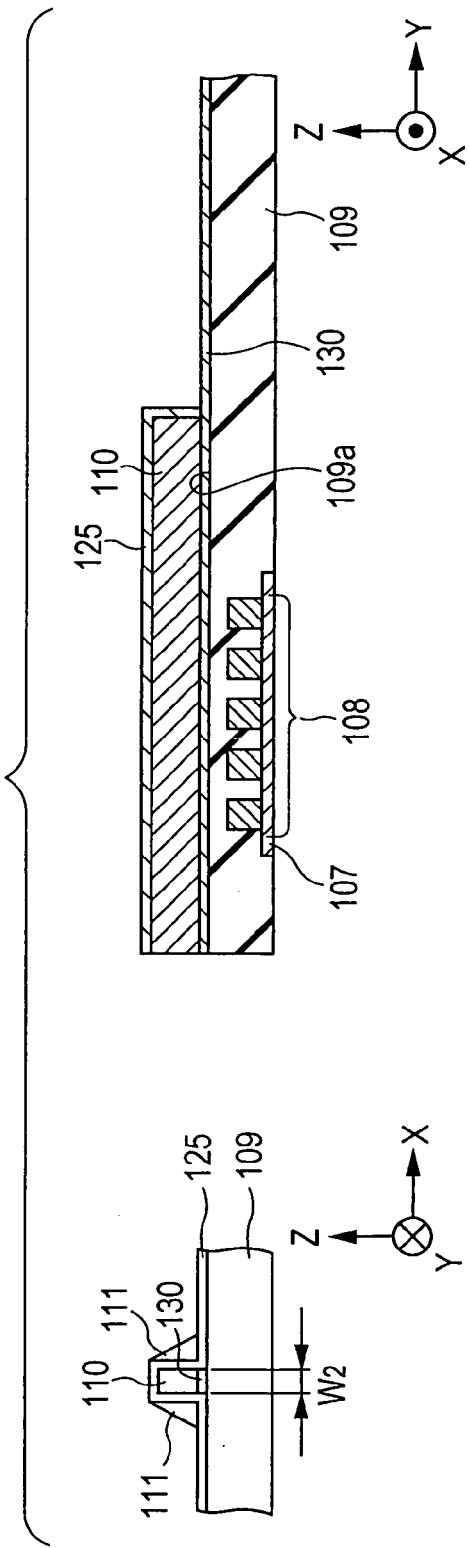

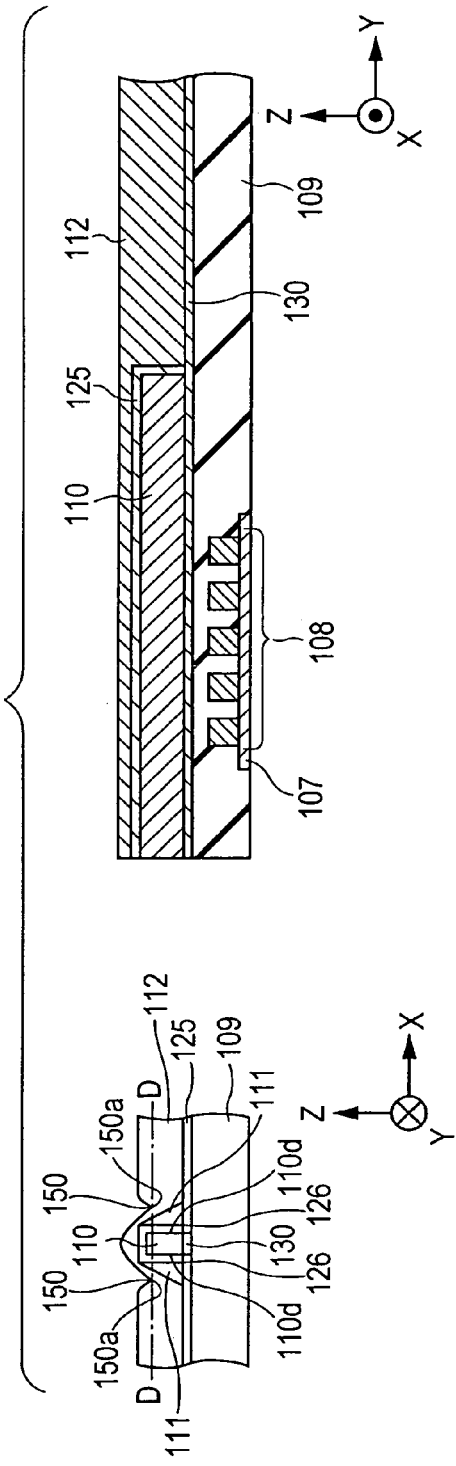
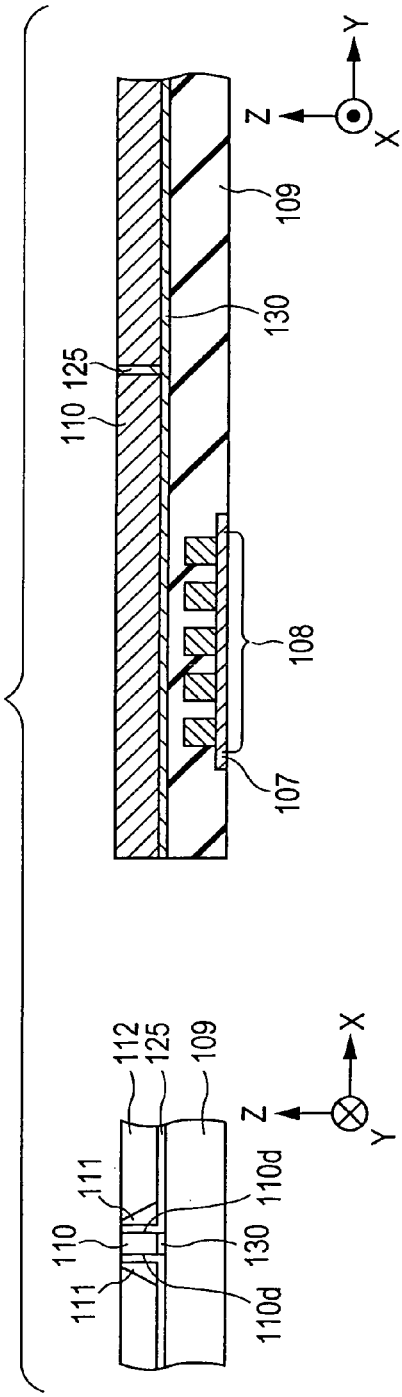

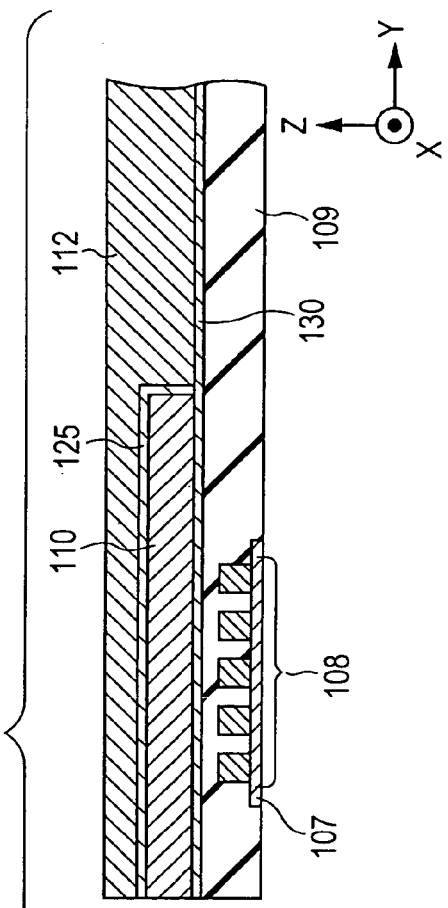
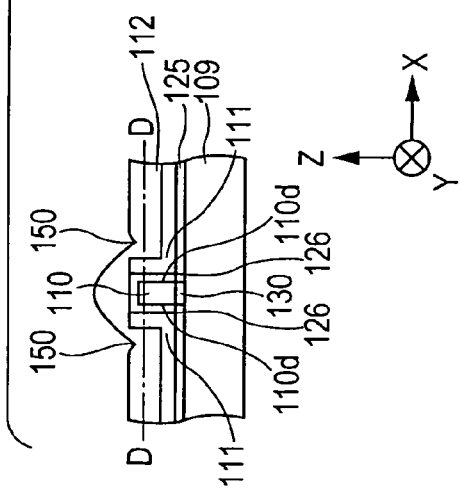
FIG. 12
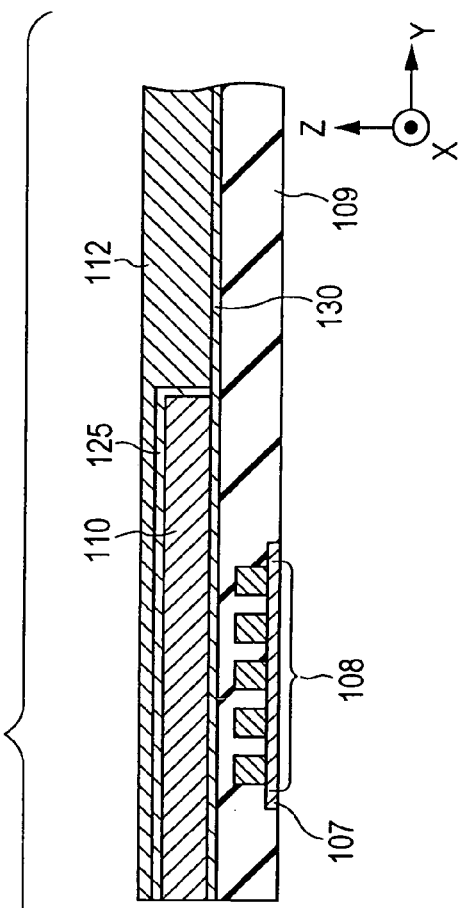
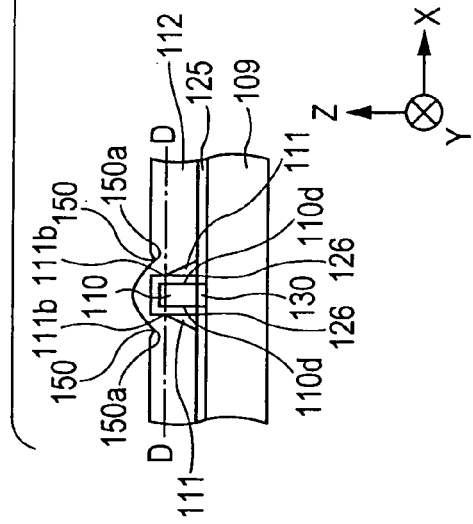
FIG. 13

METHOD FOR MANUFACTURING A MAGNETIC HEAD

This application claims the benefit of priority to Japanese Patent Application No. 2004-043757 filed on Feb. 20, 2004, herein incorporated by reference.

BACKGROUND OF THE INVENTION

1. Field of the Invention

The present invention relates to a magnetic head for recording by applying a magnetic field to a recording medium, and particularly to a magnetic head with uniform quality comprising a magnetic layer which can be precisely formed with a decreased amount of processing. The present invention also relates to a method for manufacturing the magnetic head.

2. Description of the Related Art

Each of Japanese Unexamined Patent Application Publication Nos. 11-232609 and 7-272211 discloses a method for manufacturing a magnetic head. As shown in FIG. 2 of Japanese Unexamined Patent Application Publication No. 11-232609, the method for manufacturing a magnetic head comprises forming an alumina film for forming a gap so that it projects from a substrate, forming a permalloy film to cover the alumina film (FIG. 2(a)), forming a SiO₂ film over the permalloy film (FIG. 2(b)), and polishing the alumina film together with the SiO₂ and permalloy films using a horizontal plane formed in the SiO₂ film as a stopper for stopping the polishing (FIG. 2(c)).

FIG. 2(b) of Japanese Unexamined Patent Application Publication No. 11-232609 shows a state in which the upper surface of the permalloy film covering the alumina film depends on the shape of the alumina film.

However, when the permalloy film is actually formed over the alumina film, the permalloy film is formed in such a shape as shown in FIG. 20 based on the shape of the alumina film, unlike the shape shown in FIG. 2(b) of Japanese Unexamined Patent Application Publication No. 11-232609.

FIG. 20 is a drawing showing an actual state rewritten from the state shown in FIG. 2(b) of Japanese Unexamined Patent Application Publication No. 11-232609. In FIG. 20, reference numeral 1 denotes a substrate; reference numeral 2, an alumina film; reference numeral 3, a permalloy film; and reference numeral 4, a SiO₂ film.

As shown in FIG. 20, the upper surface 3a of the permalloy film 3 formed over the alumina film 2 on the substrate 1 includes first, second, and third concave portions 3b, 3c, and 3d formed above the left edge 2a, the right edge 2b, and the top edge 2c, respectively, of the alumina film 2. This is because when the permalloy film 3 is formed over the alumina film 2, the permalloy film 3 is grown on the horizontal plane (substantially parallel to the X-Y direction shown in the drawing) 2e of the alumina film 2 in the direction (the Z direction shown in the drawing) substantially perpendicular to the horizontal plane 2e, and thus the growth rate of the permalloy film 3 in the Z direction is high. However, on the vertical plane (substantial parallel to the Z direction) 2f of the alumina film 2, the permalloy film 3 is easily grown in the direction (i.e., the X direction shown in the drawing) perpendicular to the vertical plane, and thus the growth rate of the permalloy film 3 on the vertical plane 2f is lower than that on the horizontal plane 2e in the Z direction. The growth rate of the permalloy film 3 on the horizontal plane 2e is different from that on the vertical plane 2f in the Z direction shown in the drawing. Therefore, the thickness of the permalloy film 3 on the horizontal plane 2e becomes different from that on the vertical plane 2f in the Z direction shown in the drawing.

Japanese Unexamined Patent Application Publication No. 7-272211 also discloses a process for manufacturing a magnetic head on the basis of the same idea as that of the invention disclosed in Japanese Unexamined Patent Application Publication No. 11-232609. As shown in FIG. 1 of Japanese Unexamined Patent Application Publication No. 7-272211, the method for manufacturing a magnetic head comprises forming a magnetic core on a substrate with a first insulation layer provided therebetween, forming a second insulation layer to cover the sides and the top of the magnetic core, forming a hard metal layer on the second insulation layer to form a wafer (FIG. 1(a)), and polishing the magnetic core together with the hard metal film and the second insulation layer (FIGS. 1(b) and (c)) using a horizontal plane formed on the hard metal film as a polishing stopper for stopping the polishing (FIG. 1(d)).

FIG. 1(a) of Japanese Unexamined Patent Application Publication No. 7-272211 shows a state in which the upper surface of the second insulation layer covering the magnetic core depends on the shape of the magnetic core.

However, when the second insulation layer is actually formed over the magnetic core, the second insulation layer is formed in such a shape as shown in FIG. 21 on the basis of the shape of the magnetic core.

FIG. 21 is a drawing showing an actual state rewritten from the state shown in FIG. 1(a) of Japanese Unexamined Patent Application Publication No. 7-272211. In FIG. 21, reference numeral 11 denotes a substrate; reference numeral 12, a first insulation layer; reference numeral 13, a magnetic core; reference numeral 14, a second insulation layer; and reference numeral 15, a hard meal film.

As shown in FIG. 21, the upper surface 14a of the second insulation layer 14 formed over the magnetic core 13 includes first and second concave portions 14a and 14c formed on the sides of the left side 13a and the right side 13b, respectively, of the magnetic core 13. This is because when the second insulation layer 14 is formed over the magnetic core 13, the second insulation layer 14 is grown on the horizontal plane 13c of the magnetic core 13, which is substantially parallel to the X-Y direction shown in the drawing, in the direction (the Z direction shown in the drawing) substantially perpendicular to the horizontal plane 13c, and thus the growth rate of the second insulation layer 14 in the Z direction is high. However, on both sides 13a and 13b perpendicular to the horizontal plane 13c, the second insulation layer 14 is easily grown on both sides 13a and 13b in the X direction shown in the drawing, and thus the growth rate of the second insulation layer 14 on both sides 13a and 13b is lower than that on the horizontal plane 13c in the Z direction. The growth rate of the second insulation layer 14 on the horizontal plane 13c is different from that on both sides 13a and 13b in the Z direction shown in the drawing. Therefore, the thickness of the second insulation layer 14 on the horizontal plane 13c becomes different from that on both sides 13a and 13b in the Z direction shown in the drawing.

When a magnetic layer of a magnetic head is produced based on the methods for manufacturing a magnetic head disclosed in the above-described documents, the magnetic layer can be produced by the method shown in FIGS. 22 to 26.

First, as shown in FIG. 22, a seed layer 22 is formed on a substrate 21. Next, as shown in FIG. 23, a magnetic layer 23 is formed on the seed layer 22 by a resist process (using resist R shown in the drawing), and then the resist R is removed. Then, as shown in FIG. 24, a third material layer 24 is formed to cover the magnetic layer 23. As shown in FIG. 25, a second material layer 25 is formed to cover the third material layer 24. Then, the third material layer 24 and the magnetic layer 23 are polished along line D-D shown in FIG. 25 together with the second material layer 25 to form the magnetic layer 23 for a magnetic head in the state shown in FIG. 26. In the state shown in FIG. 25, like in the states shown in FIG. 20 and 21 rewritten from the states shown in FIG. 2(b) and FIG. 1(a) of Japanese Unexamined Patent Application Publication Nos. 11-232609 and 7-272211, respectively, the second material layer 25 has concave portions 25a formed on both sides of the magnetic layer 23. This is because like in the manufacturing methods disclosed in Japanese Unexamined Patent Application Publication Nos. 11-232609 and 7-272211, the growth rate of the second material layer 25 on the horizontal plane 24a (parallel to the X-Y plane shown in FIG. 25) is different from that on the vertical plane 24b (parallel to the Z direction shown in FIG. 25) in the Z direction. In this case, the growth rate on the horizontal planes 24a is higher than that on the vertical plane 24b. Namely, the second material layer 25 grown on the horizontal plane 24a joins the second material layer 25 grown on the vertical planes 24b above the corners 26 formed at the respective boundaries between the horizontal plane 24a and the vertical planes 24b, thereby forming the larger concave portions 25a above the corners 26.

When polishing is performed for forming the magnetic layer 23 for a vertical magnetic recording magnetic head in the step shown in FIG. 25, differences between the polishing rates of the second material layer 25, the third material layer 24, and the magnetic layer 23 cause a problem in which a portion concaving in the direction opposite to the Z direction, i.e., dishing, occurs in the upper surface 23a of the magnetic layer 23 after polishing as shown in FIG. 27, or a portion projecting in the Z direction occurs on the upper surface 23 of the magnetic layer 23 as shown in FIG. 28. The problem is due to the fact that the materials are polished in different degrees because of differences between the CMP processing rates of the second material layer 25, the third material layer 24, and the magnetic layer 23.

When the dishing or the projecting portion occurs on the upper surface 23a of the magnetic layer 23, a recording signal is recorded in a distorted form on a recording medium to fail to perform accurate recording, thereby causing the problem of generating noise, i.e., smile, during reproduction of the recording signal. Therefore, the upper surface 23a of the magnetic layer 23 must be formed as a planarized surface.

When a magnetic head is manufactured by any one of the conventional methods for manufacturing a magnetic head shown in FIGS. 20 and 21, and 22 to 26, the concave portions 3b, 3c, and 3d, 14b and 14c, or 25a remain in the polished surface after polishing unless polishing is performed to a portion below the lower ends of the concave portions 3b, 3c, and 3d shown in FIG. 20, the lower ends of the concave portions 14b and 14c shown in FIG. 21, or the lower ends 25b of the concave portions 25a shown in FIG. 25 in the polishing step. As a result, the polished surface cannot be formed as a planarized surface. Therefore, in order that the polished surface can be formed as a planarized surface, polishing must be performed to a portion below the lower ends of the concave portions 3b, 3c, and 3d, 14b and 14c, or 25a in the polishing step, and thus the polishing amount must be increased.

Also, in the CMP (polishing) performed in the method for manufacturing a magnetic head shown in FIG. 25, when the dishing or the projecting portion occurs on the upper surface 23a of the magnetic layer 23, a planarized surface cannot be formed unless the polishing amount of the magnetic layer 23 is increased by an amount corresponding to the concave portion occurring due to dishing or the projecting portion. Therefore, the polishing amount must be increased.

However, polishing error and variations in the polishing amount are increased as the polishing mount is increased, and there is thus limitation in precise manufacture of a magnetic head having uniform quality.

Also, when the polishing amount is increased, each of the members must be formed in a larger thickness in expectation of an increase in the polishing amount, thereby increasing the manufacturing time and cost.

SUMMARY OF THE INVENTION

Accordingly, it is an object of the present invention to solve the above problems of the conventional manufacturing methods and provide a magnetic head with uniform quality which can be precisely manufactured with a decreased amount of processing, and a method for manufacturing the magnetic head.

The present invention provides a magnetic head comprising a first magnetic layer formed on a first magnetic layer formation surface and having a track width at a surface facing a recording medium; a second magnetic layer having a width dimension larger than the track width, the first and second magnetic layers being disposed with a space therebetween and directly or indirectly connected together in a rear portion in the height direction; and a coil layer disposed in the space between the first and second magnetic layers, for applying a recording magnetic field to the first and second magnetic layers. In the magnetic head, first material layers are disposed on both sides of the first magnetic layer to cover the respective boundaries between the top of the first magnetic layer formation surface and the sides of the first magnetic layer, each of the first material layers having a shape in which the width dimension in the track width direction gradually decreases in the upward direction, and a second material layer is formed around the first material layers.

In the magnetic head, the first material layers are formed on both sides of the first magnetic layer, and thus the first magnetic layer is supported by the first material layers even when an external force is applied to the first magnetic layer. Therefore, damage to the first magnetic layer can easily be prevented. Also, the width dimension of each of the first material layers in the track width direction gradually decreases upwardly. Therefore, in manufacturing the magnetic head, the polishing amount of the first material layers in polishing of components such as the first magnetic layer together with the first material layers can be relatively decreased. Consequently, polishing can be properly performed, and thus the top of the first magnetic layer can be formed as a planarized plane.

In this case, each of the first material layers can be tapered so that the width dimension in the track width direction decreases.

The upper surfaces of the first material layers are preferably formed at the same height as the upper surface of the first magnetic layer.

In this configuration, the first magnetic layer can easily be supported, and thus damage to the first magnetic layer can be effectively prevented.

Furthermore, the first material layers comprise at least one of $SiO_2$, Al—Si—O, Ti, W, and Cr, and the second material layer comprises $Al_2O_3$. The first material layers may comprise at least one of Ti, W, and Cr, and the second material layer may comprise one or both of $SiO_2$ and Al—Si—O.

In this configuration, a polishing step can be properly performed in the manufacturing process.

Furthermore, a third material layer is formed over the first magnetic layer formation surface and the first magnetic layer. The first material layers are preferably formed at the respective boundaries between the top of the first magnetic layer formation surface and the sides of the first magnetic layer through the third material layer.

In this configuration, the components such as the first magnetic layer can be protected from damage due to polishing in the process for manufacturing the magnetic head.

The present invention also provides a method for manufacturing a magnetic head comprising a first magnetic layer formed on a first magnetic layer formation surface and having a track width at a surface facing a recording medium, and a second magnetic layer having a width dimension larger than the track width, the first and second magnetic layers being disposed with a space therebetween and directly or indirectly connected together in a rear portion in the height direction, the method comprising the following steps:

(a) the step of forming the first magnetic layer on the first magnetic layer formation surface;

(b) the step of forming a first material layer-forming layer over the first magnetic layer formation surface and the first magnetic layer;

(c) the step of partially removing the first material layer-forming layer so that the first material layers are disposed at the respective boundaries between the top of the first magnetic layer formation surface and the sides of the first magnetic layer, and the width dimension of each first material layer in the track width direction gradually decreases in the upward direction;

(d) the step of forming a second material layer over the first magnetic layer formation surface, the first material layers, and the first magnetic layer;

(e) the step of polishing the first and second material layers and the first magnetic layer to expose the upper surface of the first magnetic layer and form the upper surfaces of the second material layer and the first magnetic layer as the same planarized surface; and (f) the step of forming a coil layer above or below the first magnetic layer.

In the method for manufacturing the magnetic head of the present invention, the first material layers is formed at the respective boundaries between the top of the first magnetic layer formation surface and the sides of the first magnetic layer. Therefore, when the second material layer is formed, the second material layer is raised by the first material layers, and the first material layers function as layers for raising the second material layer. Therefore, concave portions formed in the second material layer above the respective boundaries between the first magnetic layer formation surface and the first magnetic layer can be decreased. Thus, when the third material layer and the first magnetic layer are polished together with the second material layer to form the planarized surface, the planarized surface can be formed by processing in a small amount. As a result, polishing error and variations in the polishing amount can be decreased to permit the precise manufacture of a magnetic head having uniform quality.

Since the polishing amount can be decreased, the first magnetic layer and the second material layer need not be formed in larger thicknesses in expectation of an increase in the polishing amount, thereby decreasing the manufacturing time and cost.

Also, the width dimension of each first material layer in the track width direction gradually decreases in the upward direction, and each first material layer has a pointed top. Therefore, in a final stage of the polishing step, the polishing area of the first material layers can be decreased. Thus, the second material layer, the third material layer, and the first magnetic layer are easily polished to substantially the same thickness dimension, thereby forming the polished surface as a planarized surface at the end of polishing. Therefore, dishing or a projecting portion is little formed on the upper surface of the first magnetic layer, thereby avoiding a recording signal from being recorded in a distorted form on a recording medium by the first magnetic layer. Thus, the problem of producing noise, i.e., smile, during reproduction of a recording signal can be prevented.

In the step (c), each of the first material layers can be tapered so that the width dimension decreases.

In the step (e), the upper surfaces of the first material layers and the first magnetic layer are preferably formed as the same planarized surface.

In this configuration, the planarized surface can be easily formed in the polishing step. In the step (e), polishing can be finished using the first material layers as a polishing stopper, thereby permitting precise and secured polishing.

In the step (d), the second material layer is preferably formed using a material having a higher polishing rate than that of the first material layers.

In this configuration, the planarized surface can be easily formed in the polishing step.

In this case, the first material layers comprise at least one of $SiO_2$, Al—Si—O, Ti, W, and Cr, and the second material layer comprises $Al_2O_3$. The first material layers may comprise at least one of Ti, W, and Cr, and the second material layer may comprise one or both of $SiO_2$ and Al—Si—O.

Furthermore, a third material layer is formed over the first magnetic layer formation surface and the first magnetic layer between the steps (a) and (b). In the step (b), the first material layer-forming layer is preferably formed on the top of the first magnetic layer formation surface and the top of the first magnetic layer through the third material layer.

In this configuration, when the first material layers are formed by etching in the step (c), the components such as the first magnetic layer can be protected from damage due to the etching process.

In the magnetic head of the present invention, the first material is formed on both sides of the first magnetic layer, and thus the first magnetic layer is supported by the first material layers even when an external force is applied to the first magnetic layer. Therefore, damage to the first magnetic layer can easily be prevented.

In the method for manufacturing the magnetic head of the present invention, the first material layers are disposed at the respective boundaries between the top of the first magnetic layer formation surface and the sides of the first magnetic layer. Therefore, when the second material layer is formed, the second material layer is raised by the first material layers, and the first material layers function as a layer for raising the second material layer. Therefore, concave portions formed in the second material layer above the respective boundaries between the first magnetic layer formation surface and the first magnetic layer can be decreased. Thus, when the third material layer and the first magnetic layer are polished together with the second material layer to form the planarized surface, the planarized surface can be formed by polishing in a small amount. As a result, polishing error and variations in the polishing amount can be decreased to permit the precise manufacture of the magnetic head having uniform quality.

Since the polishing amount can be decreased, the first magnetic layer and the second material layer need not be formed in larger thicknesses in expectation of an increase in the polishing amount, thereby decreasing the manufacturing time and cost.

Also, the width dimension of each first material layer in the track width direction gradually decreases in the upward direction, and each first material layer has a pointed top. Therefore, in the final stage of the polishing step, the polishing area of the first material layers can be significantly decreased, and the polishing amount of the first material layers can be decreased. Thus, the second material layer, the third material layer, and the first magnetic layer are easily polished to substantially the same thickness dimension, thereby forming the polished surface as a planarized surface at the end of polishing. Therefore, dishing or a projecting portion is little formed on the upper surface of the first magnetic layer, thereby avoiding a recording signal from being recorded in a distorted form on a recording medium by the first magnetic layer. Thus, the problem of producing noise, i.e., smile, during reproduction of a recording signal can be prevented.

BRIEF DESCRIPTION OF THE DRAWINGS

FIG. 1 is a longitudinal sectional view showing a magnetic heat according to a first embodiment of the present invention;

FIG. 2 is a partial front view of the magnetic head shown in FIG. 1;

FIG. 3 is a partial plan view of the magnetic head shown in FIG. 1;

FIG. 6 is a drawing showing a step after the step shown in FIG. 5;

FIG. 7 is a drawing showing a step after the step shown in FIG. 6;

FIG. 8 is a drawing showing a step after the step shown in FIG. 7;

FIG. 9 is a drawing showing a step after the step shown in FIG. 8;

FIG. 10 is a drawing showing a step after the step shown in FIG. 9;

FIG. 11 is a drawing showing a step after the step shown in FIG. 10;

FIG. 12 is a comparative drawing illustrating a method for manufacturing a magnetic head according to the present invention;

FIG. 13 is a drawing showing a step of another method for manufacturing a magnetic head according to the present invention;

DESCRIPTION OF THE PREFERRED EMBODIMENTS

Figure 4:
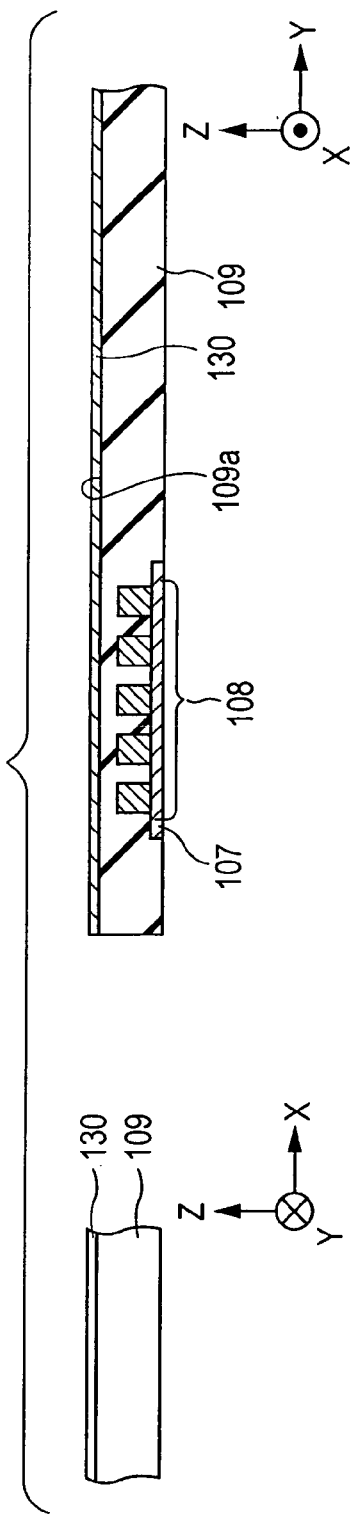
FIG. 4 is a drawing showing a step of a method for manufacturing the magnetic head shown in FIG. 1.

FIG. 1 is a longitudinal sectional view showing a magnetic head according to a first embodiment of the present invention.

The magnetic head H1 shown in FIG. 1 is a so-called vertical recording magnetic head which applies a vertical magnetic field to a recording medium M to magnetize a hard film Ma of the recording medium M in a vertical direction.

The recording medium M has, for example, a disk shape, and comprises the surface hard film Ma having high residual magnetization and an inside soft film Mb having high magnetic permeability. The recording medium M is rotated around the center of the disk as a rotational axis.

A slider 101 comprises a nonmagnetic material such as $Al_2O_3 \cdot TiC$, and has a facing surface 101a facing the recording medium M. When the recording medium M is rotated, the slider 101 floats above the surface of the recording medium M due to a surface air flow or the slider 101 slides on the recording medium M. In FIG. 1, the direction of movement of the recording medium M relative to the slider 101 is shown by arrow A.

In the slider 101, a nonmagnetic insulation layer 102 comprising an inorganic material such as $Al_2O_3$ or $SiO_2$ is formed on the trailing-side surface 101b, and a reading part HR is formed on the nonmagnetic insulation layer 102.

The reading part HR comprises a lower shield layer 103, an upper shield layer 106, and a reading element 104 disposed in an inorganic insulation layer (gap insulation layer) 105 between the lower shield layer 103 and the upper shield layer 106. The reading element 104 is a magnetoresistive element such as AMR, GMR, TMR, or the like.

Furthermore, a plurality of first coil layers 108 made of a conductive material is formed on the upper shield layer 106 with a coil insulation underlying layer 107 provided therebetween. The first coil layers 108 are made of, for example, at least one nonmagnetic metal material selected from Au, Ag, Pt, Cu, Cr, Al, Ti, NiP, Mo, Pd, and Rh. The first coil layers 108 may have a laminated structure comprising two or more of these nonmagnetic metal materials.

Furthermore, a coil insulation layer 109 is formed around the first coil layers 108, the coil insulation layer 109 being made of an inorganic insulation material such as $Al_2O_3$ or an organic insulation material such as resist.

The upper surface 109a of the coil insulation layer 109 is formed as a planarized surface on which a seed layer 130 is formed. A main magnetic pole 110 is formed on the seed layer 130 to have a predetermined length L2 from the facing surface H1a in the height direction and a width dimension corresponding to a track width Tw in the track width direction (the X direction shown in the drawing). The upper surface 109a of the coil insulation layer 109 serves as a first magnetic layer formation surface in the present invention. The main magnetic pole 110 corresponds to a first magnetic layer of the present invention and is formed by, for example, plating a ferromagnetic material. The main magnetic pole 110 comprises a material with a high saturation magnetic flux density, such as Ni—Fe, Co—Fe, Ni—Fe—Co, or the like.

Also, a yoke portion 121 is formed integrally with the main magnetic pole 110 to extend from the base end 110b of the main magnetic pole 110 so that the width dimension W1 in the track width direction gradually increases from the track width Tw in the height direction (the Y direction shown in the drawing). A first magnetic portion 160 comprises the main magnetic pole 110 and the yoke portion 121 (refer to FIG. 3). However, the main magnetic pole 110 and the yoke portion 121 may be formed as separate components. In the magnetic head Hi shown in FIG. 1, the first magnetic portion 160 comprising the main magnetic pole 110 and the yoke portion 121 functions as a magnetic portion disposed on the reading part HP side.

More specifically, the track width Tw is in a range of 0.03 μm to 0.5 μm, the length L2 is in a range of 0.03 μm to 0.5 μm.

In the yoke portion 121, the maximum width dimension W1 in the track width direction (the X direction shown in the drawing) is about 1 μm to 100 μm, and the length dimension L3 in the height direction is about 1 μm to 100 μm.

FIG. 2 is a front view of the magnetic head H1 shown in FIG. 1. FIG. 1 is a sectional view of the magnetic head taken along a one-dot chain line in FIG. 2.

As shown in FIG. 2, the main magnetic pole 110 exposed at the facing surface H1a has a width dimension Wt in the track width direction (the X direction shown in the drawing). Although not shown in the drawing, the dimension of the yoke portion 121 in the track width direction is larger than the width dimension Wt of the main magnetic pole 110 in the track width direction (refer to FIG. 3).

As shown in FIGS. 1 and 2, a third material layer 125 is formed on the upper surface 109a of the coil insulation layer 109, which serves as the first magnetic layer formation surface in the present invention, and on both sides and the upper surface 110a of the main magnetic pole 110.

The third magnetic layer 125 may be not necessarily formed. However, as described below for the manufacturing method, when a first magnetic layer is formed in the shape shown in FIG. 2 by etching, the third material layer 125 can protect the main magnetic pole 110 and the coil insulation layer 109 from damage due to the etching. Therefore, the third material layer 125 is preferably formed.

As shown in FIG. 2, first material layers 111 are formed on both sides of the main magnetic pole 110 through the third material layer 125 so as to be disposed at the respective boundaries between the upper surface 109a of the coil insulation layer 109 and the sides 110d of the main magnetic pole 110.

As shown in FIG. 2, the first material layers 111 are formed so that the width dimension in the track width direction decreases in the upward direction (the Z direction shown in the drawing). In the embodiment shown in FIG. 2, the first material layers 111 are tapered so that the width dimension in the track width direction decreases. The upper surfaces 111a of the first material layers 111 is at the same height (in the thickness direction of the main magnetic pole 110 and the first material layers 111, i.e., in the Z direction shown in the drawing) as that of the upper surface 110a of the main magnetic pole 110.

In the magnetic head H1 of the present invention, the first material layers 111 are formed on both sides of the main magnetic pole 110, and thus the main magnetic pole 110 is supported by the first material layers 111 even when an external force is applied to the main magnetic pole 110. Therefore, damage to the main magnetic pole 110 can be easily prevented.

The upper surfaces 111a of the first material layers 111 may be at a height different from that of the upper surface 110a of the main magnetic pole 110. For example, the upper surface 111a may be at a height lower than that of the upper surface 110a. However, when the upper surfaces 111a are at the same height as that of the upper surface 110a, the main magnetic pole 110 can be easily supported to effectively prevent damage to the main magnetic pole 110. Therefore, the upper surface 111a is preferably at the same height as that of the upper surface 110a.

As shown in FIG. 2, a second material layer 112 is formed around the first material layers 111. The upper surface 112a of the second material layer 112 is at the height as that of the upper surface 110a of the main magnetic pole 110. Since, as described above, the upper surfaces 111a of the first material layers 111 are also at the height as that of the upper surface 110a of the main magnetic pole 110, the upper surface 110a of the main magnetic pole 110, the upper surfaces 111a of the first material layers 111, and the upper surfaces 112a of the second material layer 112 form the same planarized surface.

In the present invention, the upper surface 110a of the main magnetic pole 110 is formed as a planarized surface without dishing in which a portion concaves downward (in the direction opposite to the Z direction shown in FIG. 2) or a portion projects upward (in the Z direction shown in FIG. 2). If the upper surface 110a is not formed as a planarized surface and has the dishing or the projecting portion, a recording signal is recorded in a distorted form on a recording medium, thereby failing to achieve accurate recording. Consequently, the problem of generating noise, i.e., smile, during reproduction of the recording signal occurs. On the other hand, in the present invention, as the upper surface 110a of the main magnetic pole 110 is formed as the planarized surface, the problem of smile can be prevented.

When the first material layers 111 comprise, for example, at least one of $SiO_2$, Al—Si—O, Ti, W, and Cr, and the second material layer 112 can comprise, for example, $Al_2O_3$. In this case, the first material layers 111 preferably comprise $SiO_2$ which can be easily milled.

When the first material layers 111 comprise, for example, at least one of Ti, W, and Cr, the second material layer 112 can comprise, for example, one or both of $SiO_2$ and Al—Si—O.

Furthermore, a gap layer 113 comprising an inorganic material such as alumina or $SiO_2$ is formed over the main magnetic pole 110, the yoke portion 121, the first material layers 111, and the second material layer 121.

As shown in FIG. 1, like the first coil layers 108, a plurality of second coil layers 115 comprising a conductive material is formed on the gap layer 113 with a coil insulation underlying layer 114 provided therebetween. The second coil layers 115 are made of, for example, at least one nonmagnetic metal material selected from Au, Ag, Pt, Cu, Cr, Al, Ti, NiP, Mo, Pd, and Rh. The second coil layers 115 may have a laminated structure comprising two or more of these nonmagnetic metal materials.

As shown in FIG. 3, the-ends 108a and 108b of the first coil layers 108 are electrically connected to the ends 115a and 115b, respectively, of the second coil layer 115 in the track width direction (the X direction shown in the drawing). As a result, the first coil layers 108 and the second coil layers 115 form a toroidal coil layer 140 wound around the main magnetic pole 110 and the yoke portion 121.

The second coil layers 115 are covered with a coil insulation layer 116 comprising an inorganic insulation material such as $Al_2O_3$ or an organic insulation material such as resist, and a return path layer 117 comprising a ferromagnetic material such as permalloy or the like and serving as a second magnetic layer in the present invention is formed over the coil insulation layer 116 and the gap layer 113. The return path layer 117 constitutes a second magnetic portion 161 relative to the first magnetic portion 160.

As shown in FIG. 2, the thickness dimension Ht of the front end 110c of the main magnetic pole 110 is smaller than the thickness Hr of the front end 117a of the return path layer 117. Also, the with dimension Wt of the front end 110c of the main magnetic pole 110 in the track width direction (the X direction shown in the drawing) is sufficiently smaller than the width dimension Wr of the front end 117a of the return path layer 117 in the same direction. Consequently, at the facing surface H1a, the area of the front end 10c of the main magnetic pole 110 is sufficiently smaller than that of the front end 117a of the return path layer 117. Therefore, the magnetic flux $\phi$ of a leakage magnetic field is concentrated in the front end 110c of the main magnetic pole 110, and the hard film Ma is magnetized by the concentrated magnetic flux $\phi$ in the vertical direction to record magnetic data.

The front end 117a of the return path layer 117 is exposed at the surface H1a facing the recording medium. Also, the connecting portion 117b of the return path layer 117 is connected to the main magnetic pole 110 in a region behind the facing surface H1a. As a result, a magnetic path is formed between the main magnetic pole 110 and the return path layer 117.

Furthermore, a Gd-determining layer 118 comprising an inorganic or organic material is formed on the gap layer 113 and at a predetermined distance from the surface H1a facing the recording medium. The gap depth of the magnetic head H1 is determined by the distance between the surface H1a facing the recording medium and the front end of the Gd-determining layer 118.

Furthermore, a lead layer 119 extended from the second coil layers 115 is formed on the coil insulation underlying layer 114 at the rear of the connecting portion 117b of the return path layer 117 in the height direction (the Y direction shown in the drawing). The return path layer 117 and the lead layer 119 are covered with a protective layer 120 comprising an inorganic nonmagnetic insulation material.

In the magnetic head H1, when a recording current is supplied to the first coil layers 108 and the second coil layers 115 through the lead layer 119, a recording magnetic field in induced in the main magnetic pole 110 and the return path layer 117 due to a current magnetic field of the current flowing through the first coil layers 108 and the second coil layers 115. As a result, the magnetic flux $\phi 1$ of the recording magnetic field is ejected from the front end 110c of the main magnetic pole 110 at the facing surface H1a, and passes through the hard film Ma and the soft film Mb of the recording medium M to write a recording signal on the recording medium M. Thereafter, the magnetic flux $\phi 1$ is returned to the front end 117a of the return path layer 117.

The method for manufacturing the magnetic head H1 shown in FIGS. 1 to 3 will be described.

FIGS. 4 to 11 show respective steps of the method for manufacturing the magnetic head H1. In each of the drawings, a partial front view of the facing surface H1a is shown on the left side, and a longitudinal sectional view is shown on the right side.

In the step shown in FIG. 4, the plurality of first coil layers 108 comprising a conductive material is formed on the reading part HR with the coil insulation underlying layer 107 provided therebetween. Then, the first coils 108 are covered with the coil insulation layer 109 comprising an inorganic insulation material such as $Al_2O_3$ or an organic insulation material such as resist. The upper surface 109a of the coil insulation layer 109 is polished by a known method such as CMP or the like to planarize the upper surface 109a.

Next, the seed layer 130 is deposited on the planarized upper surface 109a of the coil insulation layer 109 by sputtering. The seed layer 130 can be formed using a magnetic material such as NiFe or the like, or a nonmagnetic material.

Figure 5:
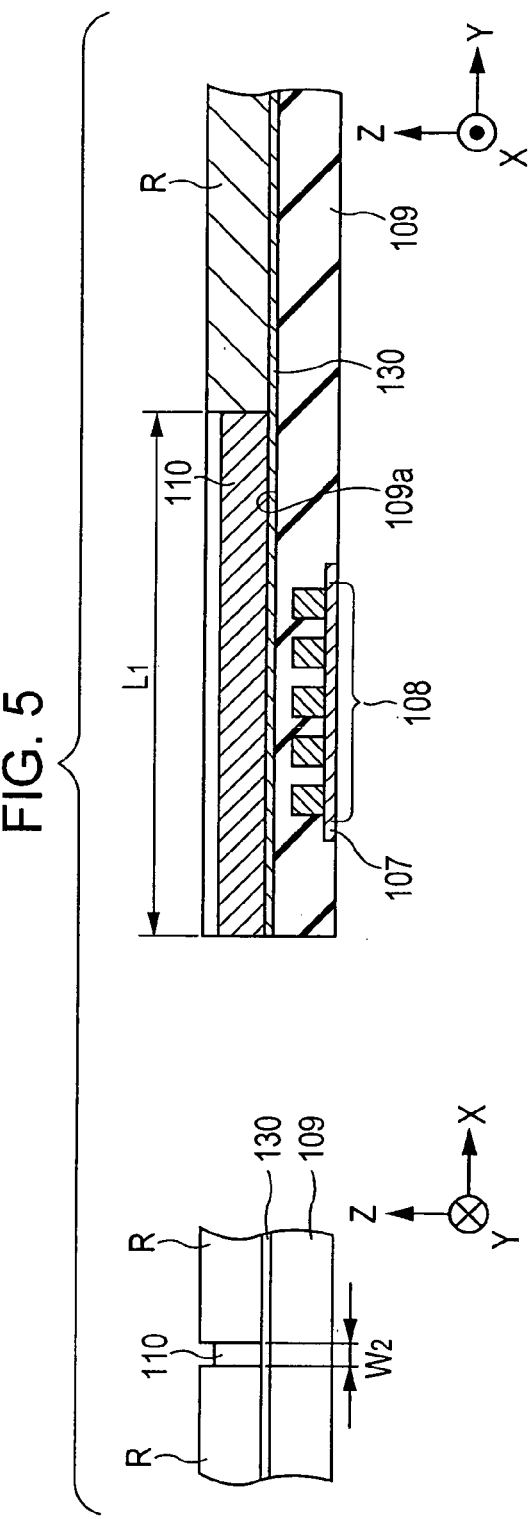
FIG. 5 is a drawing showing a step after the step shown in FIG. 4.

Next, as shown in FIG. 5, a resist layer R is formed on the seed layer 130 and then subjected to pattern exposure and development to form a trench Ra. The trench Ra has a predetermined internal width dimension W2 in the track width direction (the X direction shown in the drawing) and a predetermined depth dimension L1 from the facing surface H1a in the rearward direction (the height direction; the Y direction shown in the drawing).

As shown in FIG. 5, the upper surface 109a of the coil insulation layer 109 is planarized by a method such as CMP or the like, and thus the resist layer R can be formed to a uniform thickness. Therefore, the trench Ra can be formed by exposure and development with high precision of the internal width dimension, i.e., no variation.

In the trench Ra, the main magnetic pole 110 is formed by plating using the seed layer 130 as an electrode. Then, the resist layer R is removed.

In the step of forming the main magnetic pole 110 by plating shown in FIG. 5, the thickness of the main magnetic pole 110 must be larger than the thickness on completion. After the resist layer R is removed, the seed layer 130 exposed around the main magnetic pole 110 is removed by ion milling or the like to produce the state shown in FIG. 6. The main magnetic pole 110 may be removed by ion milling in the track width direction to decrease the dimension of the main magnetic pole 110 in the track width direction.

Next, in the step shown in FIG. 7, the third material layer 125 is formed on both sides, the rear side and the top of the main magnetic pole 110. Although the third material layer 125 may be not necessarily formed, the third material layer 125 is preferably formed because the third material layer 125 can protect the main magnetic pole 110 and the coil insulation layer 109 from damage due to etching for forming the first material layers 111 in the step shown in FIG. 8. The third material layer 125 can comprise, for example, $Al_2O_3$.

Next, as shown in FIG. 8, a layer for forming the first material layers 111 is deposited over the coil insulation layer 109 and the main magnetic layer 110 with the third material layer 125 provided therebetween. Next, etching is performed for forming the first material layers 111 so that the width dimension in the track width direction gradually decreases in the upward direction (the Z direction shown in the drawing)

as shown by broken lines in FIG. 8. In the step shown in FIG. 8, the first material layers 111 are tapered by etching so that the width dimension in the track width direction gradually decreases. FIG. 9 shows the state after etching. As the etching, anisotropic etching can be performed as schematically shown by arrows in the drawing. An example of the anisotropic etching is RIE performed by controlling conditions such as a gap pressure, an energy density, a bias, and the like.

Next, as shown in FIG. 10, the second material layer 112 is deposited on the coil insulation layer 109, the first material layer 111, and the main magnetic layer 110 through the third material layer 125. Then, polishing is carried out by CMP or the like along the line D-D shown in the drawing to form a planarized surface as shown in FIG. 11.

Then, the gap layer 113, the Gd-determining layer 118, the coil insulation underlying layer 114, the second coil layers 115, the lead layer 119, the coil insulation layer 116, the return path layer 117, and the protective layer 120 are formed by a known method to obtain the magnetic head H1 shown in FIGS. 1 to 3. The materials for the gap layer 113, the Gd-determining layer 118, the coil insulation underlying layer 114, the second coil layers 115, the lead layer 119, the coil insulation layer 116, the return path layer 117, and the protective layer 120 are described above with reference to FIGS. 1 to 3, and thus description thereof is omitted.

When the second material layer 112 is deposited in the step shown in FIG. 10, the second material layer 112 is easily grown in the Z direction on the horizontal plane (parallel to the X-Y plane shown in the drawing) 125*a* of the third material layer 125. On the other hand, the second material layer 112 is slightly grown in the Z direction on the vertical plane (parallel to the Z direction) 125*b* of the third material layer 125.

Figure 25:
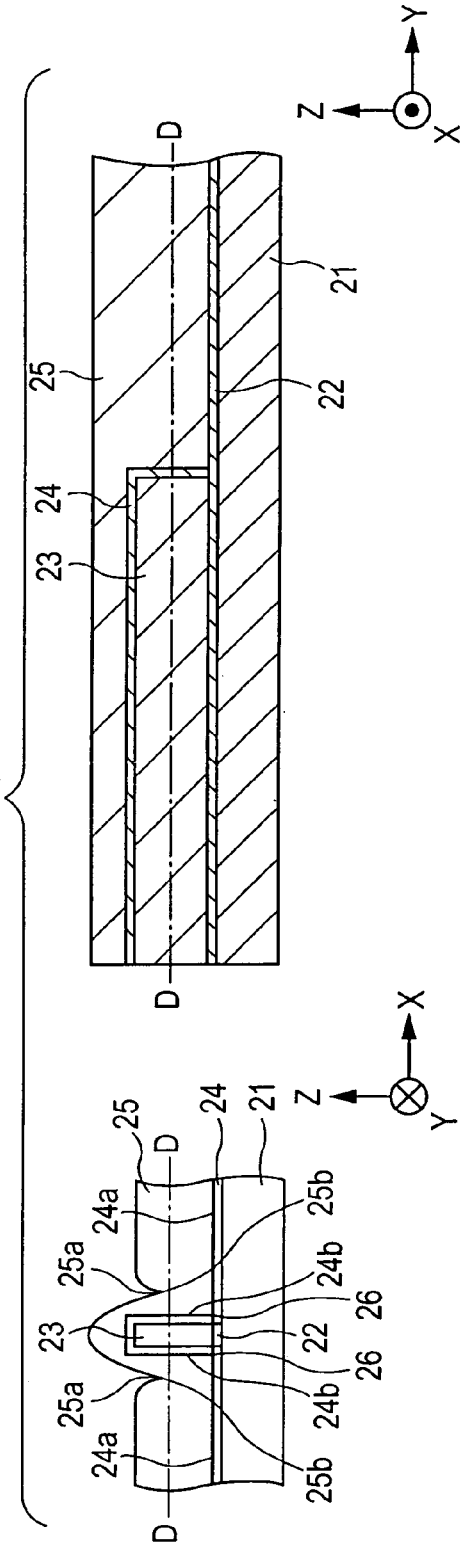
FIG. 25 is a drawing showing a step after the step shown in FIG. 24.
Figure 26:
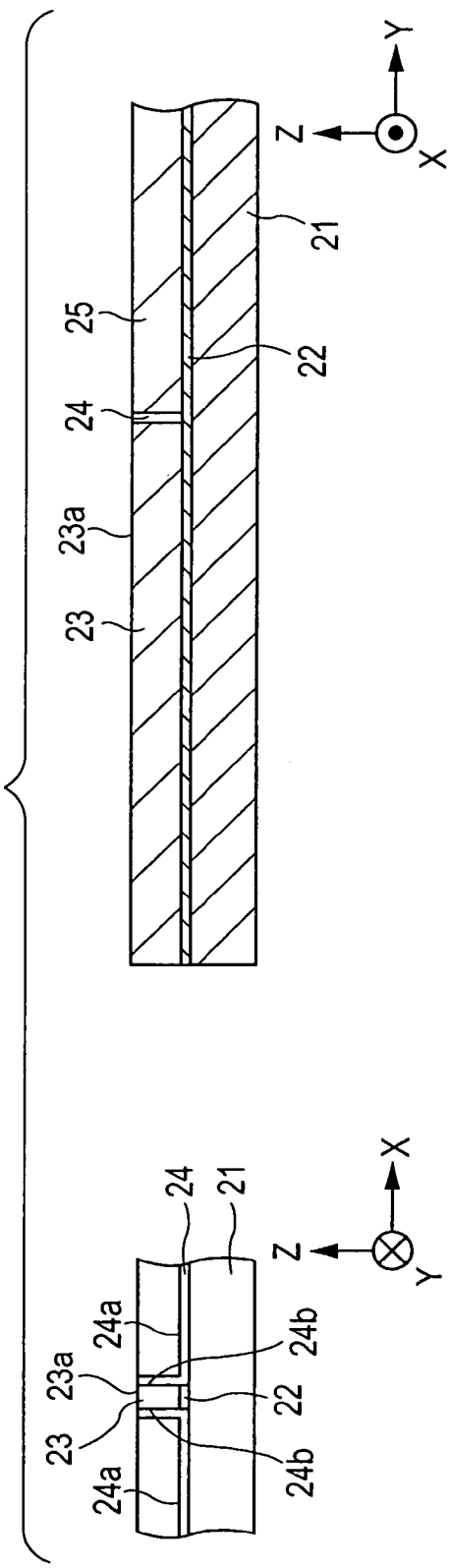
FIG. 26 is a drawing showing a step after the step shown in FIG. 25.

Therefore, for example, in the conventional manufacturing method shown in FIG. 25 in which the first material layers are not formed, the second material layer 25 grown on the horizontal plane 24*a* joins the second material layer 25 grown on the vertical planes 24*b* above the corners 26 formed at the respective boundaries between the horizontal plane 24*a* and the vertical planes 24*b*, thereby forming the larger concave portions 25*a* above the corners 26.

However, in the manufacturing method of the present invention, as shown in FIG. 10, the first material layers 111 are formed to cover the corners 126 at the respective boundaries between the horizontal plane 125*a* and the vertical planes 125*b*. Therefore, when the second material layer 112 is formed, the second material layer 112 is raised by the first material layers 111. Namely, the first material layers 111 function as a layer for raising the second material layer 112, thereby significantly decreasing the concave portions 150 produced in the second material layer 112 above the corners 126, as compared with the conventional method shown in FIG. 25.

In the conventional manufacturing method shown in FIG. 25, therefore, when the third material layer 24 and the magnetic layer 23 are polished together with the second material layer 25 to a portion below the lower ends 25*b* of the concave portions 25*a* along the line D-D shown in FIG. 25 to form the planarized surface, the polishing amount must be increased because of the large concave portions 25*a*. Therefore, the polishing error and variations in the polishing amount are increased to cause limitation in precise manufacture of the magnetic head with uniform quality.

Also, when the polishing amount is increased, the thicknesses of the magnetic layer 23 (the main magnetic pole 110) and the second material layer 25 (112) must be increased by an amount corresponding to an increase in the polishing amount, thereby increasing the manufacturing time and cost.

On the other hand, in the manufacturing method of the present invention, even when the third material layer 125 and the main magnetic pole 110 are polished together with the second material layer 112 to a portion below the lower ends 150*a* of the concave portions 150 along the line D-D shown in FIG. 10, the concave portions 150 can be completely removed by polishing in only a smaller amount because of the smaller concave portions 150. Therefore, the polishing error and variations in the polishing amount can be decreased to permit the manufacture of the magnetic head with uniform quality and high precision.

Since the polishing amount can be decreased, the thicknesses of the magnetic layer 23 (the main magnetic pole 110) and the second material layer 25 (112) need not be increased by an amount corresponding to an increase in the polishing amount, thereby decreasing the manufacturing time and cost.

From the above-described viewpoint, in the step shown in FIG. 8, the first material layers 111 must be formed to such a thickness dimension that the first material layers 111 formed by the anisotropic etching as shown in FIG. 9 can securely function as the raising layer. Specifically, the thickness dimension is preferably 0.1 μm to 0.5 μm.

In the polishing step shown in FIG. 10, the first material layers 111 can be used as a marker, i.e., a stopper, for finishing the polishing. When the first material layers 111 are used as the stopper layer in the polishing step, the polishing can be precisely and securely performed. In this case, the first material layers 111 are formed so that the width dimension in the track width direction gradually decreases in the upward direction, and thus the first material layers 111 have the pointed tops 111*a*. Therefore, in the final stage of the polishing step, the polishing area of the first material layers 111 is very small.

Figure 27:
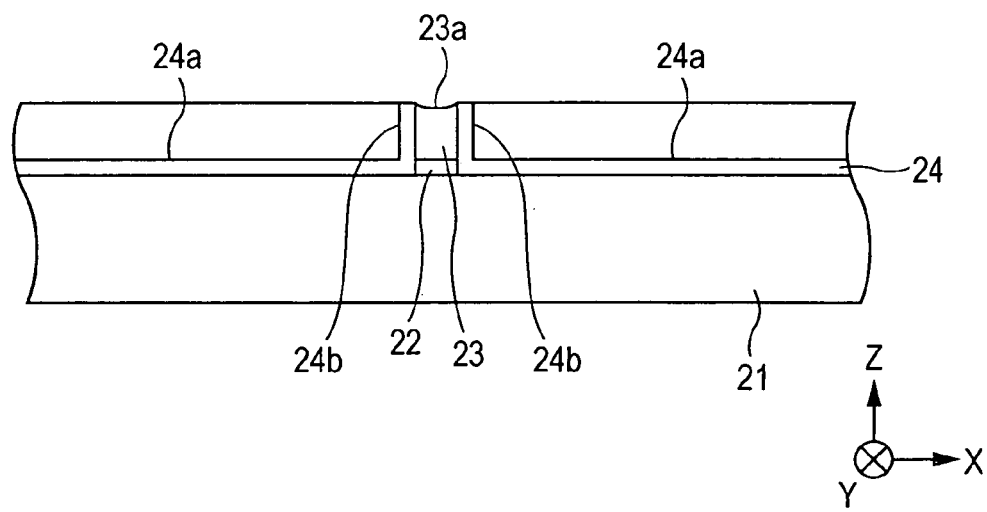
FIG. 27 is a drawing showing a step of a conventional method for manufacturing a magnetic head.
Figure 28:
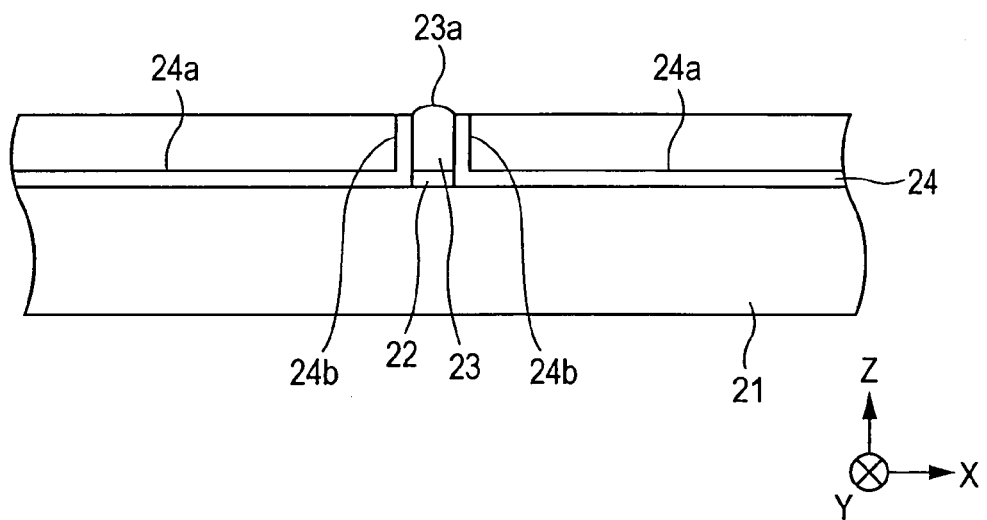
FIG. 28 is a drawing showing a step of a conventional method for manufacturing a magnetic head.

If, as shown in FIG. 12, the width dimension each first material layer 111 in the track width direction is constant in the upward direction, the polishing area of the first material layers 111 along the line D-D in the drawing becomes very large in the final stage of the polishing step. In this case, when the polishing area of the first material layers 111 becomes very large in the final stage of the polishing step, the third material layer 125, the main magnetic pole 110, and the first material layers 111 are polished in different amounts due to differences between the polishing rates of the third material layer 125, the main magnetic pole 110, and the first material layers 111. As a result, it becomes very difficult to form the polished surfaces as a planarized surface. Therefore, like in the upper surface 23*a* of the magnetic layer 23 shown in FIG. 27, so-called dishing, in which the upper surface of the main magnetic pole 110 is concaved in the direction opposite to the Z direction shown in the drawing to form a concave portion, occurs in the upper surface of the main magnetic layer 110. Alternatively, like in the upper surface 23*a* of the magnetic layer 23 shown in FIG. 28, a portion projecting in the Z direction shown in the drawing occurs.

Therefore, by decreasing the polishing amount of the first material layers 111, the second material layer 112, the third material layer 125, the main magnetic pole 110, and the first material layers 111 can be easily polished to substantially the same thickness, and thus the polished surfaces can be formed as a planarized surface at the end of polishing. In the present invention, as described above, the first material layers 111 are formed so that the width dimension in the track width direction gradually decreases in the upward direction. Therefore, the polishing area of the upper regions of the first material layers 111 in the polishing step can be decreased, thereby facilitating the formation of the polished surfaces as a planarized surface.

In the present invention, the upper surface 110a of the main magnetic pole 110 is formed as a planarized surface without the dishing or the projecting portion. If the upper surface 110a is not formed as a planarized surface and has the dishing or the projecting portion, a recording signal is recorded in a distorted form on the recording medium to fail to achieve accurate recording, thereby causing the problem of generating noise, i.e., smile, during reproduction of the recording signal. On the other hand, in the magnetic head H1 manufactured by the manufacturing method of the present invention, the upper surface 110a of the main magnetic pole 110 is formed as a planarized surface, thereby suppressing the problem of smile.

As described above, when the first material layers 111 comprise, for example, at least one of $SiO_2$, Al—Si—O, Ti, W, and Cr, and the second material layer 112 can comprise, for example, $Al_2O_3$.

In this case, the first material layers 111 preferably comprise $SiO_2$ which can easily be milled.

When the first material layers 111 comprise, for example, at least one of Ti, W, and Cr, the second material layer 112 can comprise, for example, one or both of $SiO_2$ and Al—Si—O.

The main magnetic pole 110 comprises a ferromagnetic material with a high saturation magnetic flux density, such as Ni—Fe, Co—Fe, Ni—Fe—Co, or the like.

Therefore, when the polishing step is performed by CMP using an acid slurry at a processing pressure of 25 kgf, the ratio of the polishing rate of the second material layer 112 and the third material layer 125 both comprising alumina ($Al_2O_3$) to the polishing rate of the first material layers 111 comprising $SiO_2$ is 20:1. Also, when the CMP polishing is performed using an alkaline slurry, the polishing rate of the second material layer 112 and the first material layers 111 both comprising alumina ($Al_2O_3$) is higher than that of the first material layers 111 comprising $SiO_2$.

In the polishing step under these conditions, the polishing rates of the second material layer 112, the third material layer 125, and the main magnetic pole 110 are higher than the polishing rate of the first material layers 111. Therefore, the second material layer 112, the third material layer 125, and the main magnetic pole 110 are easily polished, while the first material layers 111 are slightly polished because the polishing rate is lower than those of the material layer 112, the third material layer 125, and the main magnetic pole 110.

Therefore, the polished surfaces can be easily formed as a planarized surface.

The second material layer 112 and the third material layer 125 preferably comprise the same material because the polishing rate can be securely made higher than that of the first material layers 111. However, the second material layer 112 and the third material layer 125 may comprise different materials so long as the polishing rate can be made higher than that of the first material layers 111.

As shown in FIG. 13, when the upper surfaces 111a of the first material layers 111 are at the same height as the polishing end line D-D, only the second material layer 112, the third material layer 125, and the main magnetic pole 110, which have high polishing rates, are polished in the polishing step, but the first material layers 111 having a lower polishing rate need not be polished at the same time. Therefore, a planarized surface can be easily formed. In this case, the upper surfaces 111a of the first material layers 111 can be used as a stopper surface in the polishing step.

Figure 14:
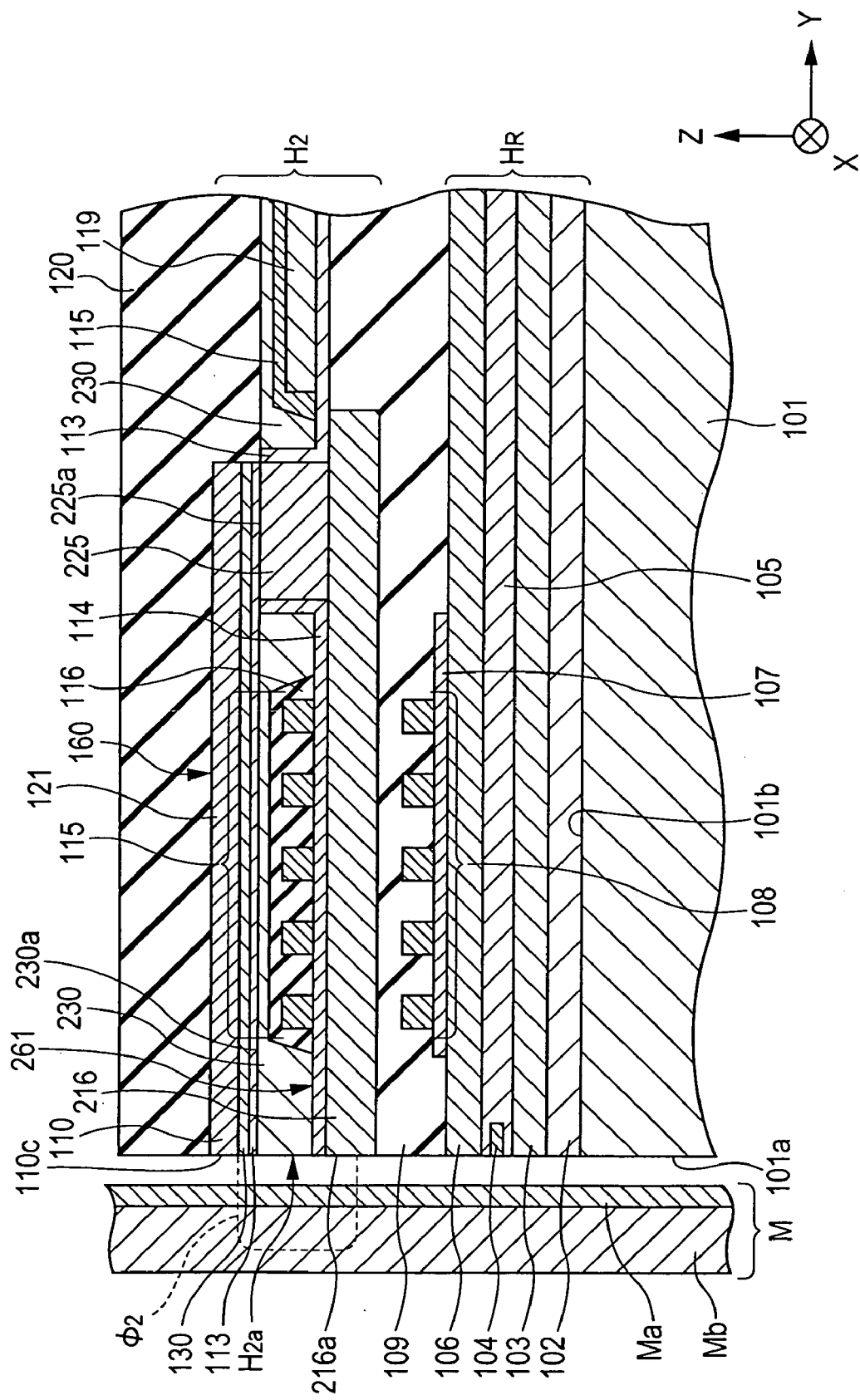
FIG. 14 is a longitudinal sectional view showing a magnetic heat according to a second embodiment of the present invention.
Figure 15:
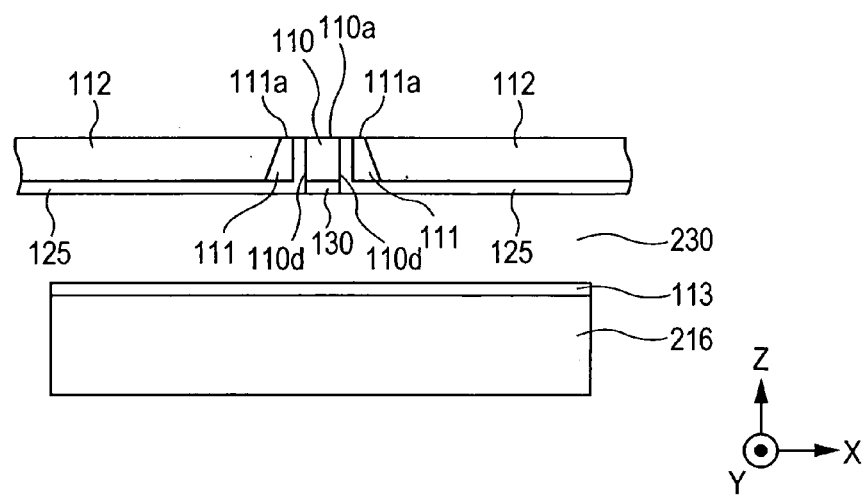
FIG. 15 is a partial front view of the magnetic head shown in FIG. 14.

FIG. 14 is a longitudinal sectional view showing a magnetic head according to a second embodiment of the present invention, and FIG. 15 is a front view of the magnetic head shown in FIG. 14, as viewed from a surface facing a recording medium. The magnetic head H2 shown in FIGS. 14 and 15 is also a so-called vertical recording magnetic head in which a vertical magnetic field is applied to a recording medium M to magnetize a hard film Ma of the magnetic medium M in the vertical direction.

The magnetic head H2 shown in FIGS. 14 and 15 has the same components as in the magnetic head H1 shown in FIGS. 1 and 2, and thus the same components as in the magnetic head H1 shown in FIGS. 1 and 2 are denoted by the same reference numerals. The detailed description thereof is omitted.

As shown in FIG. 14, the reading part HR is formed on the nonmagnetic insulation layer 102 formed on the trailing-side end 101b of the slider 101.

The recording magnetic head H2 is provided on the reading part HR comprising the lower shield layer 103, the upper shield layer 106, and the reading element 104 disposed in the inorganic insulation layer (gap insulation layer) 105 between the lower shield layer 103 and the upper shield layer 106. The recording medium-facing surface H2a of the magnetic head H2 is substantially coplanar with the facing surface 101a of the slider 101.

The magnetic head H2 for vertical magnetic recording may be mounted directly on the trailing-side end of the slider 101 without the reading part HR.

The plurality of first coil layers 108 comprising a conductive material is formed on the upper shield layer 106 with the coil insulation underlying layer 107 provided therebetween, and the coil insulation layer 109 is formed around the first coil layers 108.

Furthermore, a return path layer 216 is formed on the upper surface 109a of the coil insulation layer 109 to extend from the facing surface H2a in the height direction. The return path layer 216 comprises a ferromagnetic material such as permalloy or the like. The return path layer 216 corresponds to a second magnetic layer in the present invention and serves as a second magnetic portion 261 relative to a first magnetic portion 160 which will be described below. In the magnetic head H2 shown in FIG. 14, the second magnetic portion 261 comprising the return path layer 216 is a magnetic portion disposed on the reading part-side.

Furthermore, a connecting layer 225 comprising Ni—Fe is formed on a rear region of the top of the return path layer 216 in the height direction (the Y direction shown in the drawing).

The coil insulation underlying layer 114 is formed on the return path layer 216, and the plurality of second coil layers 115 is formed on the coil insulation underlying layer 114.

Figure 17:
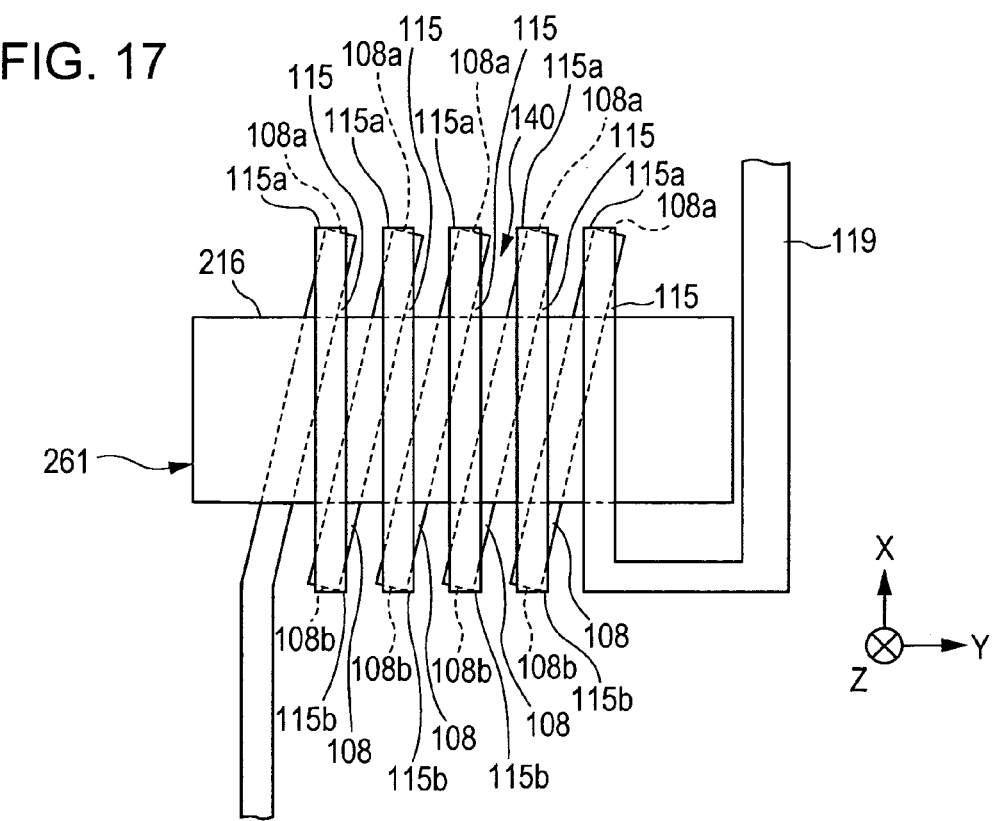
FIG. 17 is a partial plan view of the magnetic head shown in FIG. 14.

As shown in FIG. 17, the ends 108a and 108b of the first coil layers 108 are electrically connected to the ends 115a and the 115b, respectively, of the second coil layers 115 in the track width direction (the X direction shown in the drawing) to form a toroidal coil layer 140 wound around the return path layer 216 as an axis and comprising the first coil layers 108 and the second coil layers 115.

The second coil layers 115 are covered with the coil insulation layer 116 and is further covered with an insulation layer 230. The insulation layer 230 preferably comprises an inorganic insulation material. As the inorganic insulation material, at least one material can be selected from AlO, Al$_2$O$_3$, SiO$_2$, Ta$_2$O$_5$, TiO, AlN, AlSiN, TiN, SiN, Si$_3$N$_4$, NiO, WO, WO$_3$, BN, CrN, and SiON. The upper surface 230a of the insulation layer 230 is planarized by a CMP technique or the like.

Furthermore, the gap layer 113, the seed layer 130, the main magnetic pole 110, and the yoke portion 121 are formed on the upper surface 230a of the insulation layer 230. The magnetic pole layer 110 corresponds to a first magnetic layer in the present invention and constitutes the first magnetic portion together with the main magnetic pole 110 and the yoke portion 121. However, the main magnetic pole 110 and the yoke portion 121 may be formed as separate components.

Figure 16:
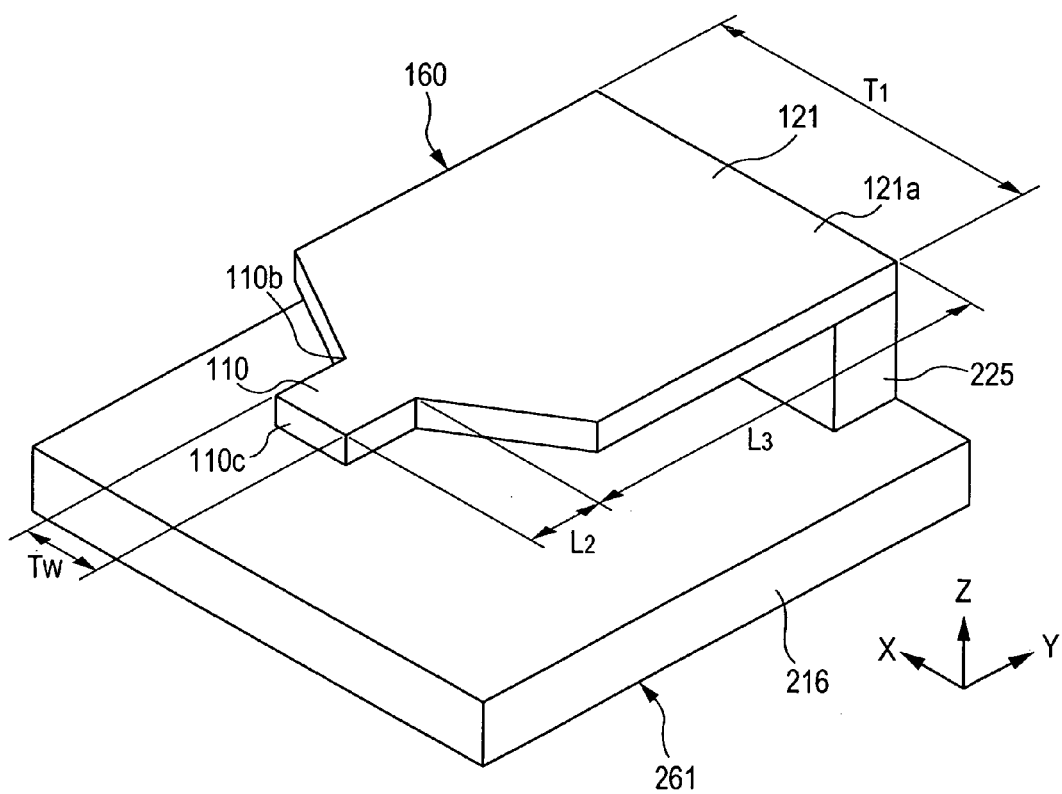
FIG. 16 is a partial perspective view of the magnetic head shown in FIG. 14.

FIG. 16 is a partial perspective view schematically showing the return path layer 216, the connecting layer 225, and the main magnetic pole 110 of the magnetic head H2 shown in FIGS. 14 and 15. As shown in FIG. 14, the main magnetic pole 110 has a width dimension defined as the track width Tw in the track width direction (the X direction) and extends for a predetermined length from the front end 110c coplanar with the facing surface H2a in the height direction (the Y direction shown in the drawing). Specifically, the track width Tw is in a range of 0.03 μm to 0.5 μm, and the length L2 is in a range of 0.03 μm to 0.5 μm.

As shown in FIG. 15, the third material layer 125 is formed on the upper surface 109a of the coil insulation layer 109, which serves as the first magnetic layer formation surface in the present invention, to cover both sides and the top 110a of the magnetic pole 110.

Although the third material layer 125 may be not necessarily formed, the third material layer 125 can protect the main magnetic layer 110 and the coil insulation layer 109 from damage due to etching for forming the first material layers 111 in the shape shown in FIG. 15 during the manufacture of the magnetic head H2. Therefore, it is preferred to form the third material layer 125.

As shown in FIG. 15, the first material layers 111 are formed on both sides of the main magnetic pole 110 with the third material layer 125 provided therebetween so as to be disposed at the respective boundaries between the upper surface 109a of the coil insulation layer 109 and the sides 110d of the main magnetic pole 110.

As shown in FIG. 15, each first material layer 111 has a shape in which the width dimension in the track width direction gradually decreases in the upward direction (the Z direction shown in the drawing). In the embodiment shown in FIG. 15, the first material layers 111 are tapered so that the width dimension in the track width direction gradually decreases. The upper surfaces 111a of the first material layers 111 are at the same height (height in the thickness direction of the main magnetic pole 110 and the first material layers 111, i.e., the height in the Z direction shown in the drawing) as the upper surface 110a of the main magnetic pole 110. However, the height of the upper surfaces 111a of the first material layers 111 may be different from that of the upper surface 110a of the main magnetic pole 110. For example, the upper surface 111a may be formed lower than the upper surface 110a. However, when the upper surface 111a is at the same height as the upper surface 110a, the first material layers 111 can be desirably used as a polishing stopper in the manufacturing step described below.

As shown in FIG. 15, the second material layer 112 is formed around the first material layers 111. The upper surface 112a of the second material layer 112 is at the same height as the upper surface 110a of the main magnetic pole 110. As described above, the upper surfaces 111a of the first material layers 111 are also at the same height as the upper surface 110a of the main magnetic pole 110. Therefore, the upper surface 110a of the main magnetic pole 110, the upper surfaces 111a of the first material layers 111, and the upper surface 112a of the second material layer 112 are formed as the same planarized surface.

When the first material layers 111 comprise, for example, at least one of SiO$_2$, Al—Si—O, Ti, W, and Cr, and the second material layer 112 can comprise, for example, Al$_2$O$_3$. In this case, the first material layers 111 preferably comprise SiO$_2$ which can be easily milled.

When the first material layers 111 comprise, for example, at least one of Ti, W, and Cr, the second material layer 112 can comprise, for example, one or both of SiO$_2$ and Al—Si—O.

As shown in FIG. 16, the yoke portion 121 is formed integrally with the main magnetic pole 110 to extend from the base end 110b of the main magnetic pole 110 in the height direction so that the width dimension W1 in the track width direction (the X direction shown in the drawing) gradually increases from the track width Tw. In the yoke portion 121, the maximum width dimension W1 in the track width direction (the X direction shown in the drawing) is about 1 μm to 100 μm, and the length dimension L3 in the height direction is about 1 μm to 100 μm.

As shown in FIGS. 14 and 16, the base end 121a of the yoke portion 121 is disposed on the connecting layer 225 so that the yoke portion 121 is magnetically connected to the upper surface 225a of the connecting layer 225. As a result, a magnetic circuit passing through the main magnetic pole 110, the yoke portion 121, the connecting layer 225, and the return path layer 216 is formed.

Furthermore, the lead layer 119 extended from the second coil layers 115 is formed on the coil insulation underlying layer 114 at the rear of the connecting layer 225 in the height direction (the Y direction shown in the drawing). The coil insulation layer 116 and the insulation layer 230 are formed on the lead layer 119, and the main magnetic pole 110 and the insulation layer 230 are covered with the protective layer 120 comprising an inorganic magnetic insulation material.

In the magnetic head H2, when a recording current is supplied to the first coil layers 108 and the second coil layers 115 through the lead layer 119, a recording magnetic field in induced in the main magnetic pole 110 and the return path layer 216 due to a current magnetic field of the current flowing through the first coil layers 108 and the second coil layers 115. As a result, the magnetic flux φ2 of the recording magnetic field is ejected from the front end 110c of the main magnetic pole 110 at the facing surface H2a, and passes through the hard film Ma and the soft film Mb of the recording medium M to write a recording signal on the recording medium M. Thereafter, the magnetic flux φ2 is returned to the front end 216a of the return path layer 216.

The main magnetic pole 110 of the magnetic head H2 shown in FIGS. 14 to 17 can be formed by the same steps as those shown in FIGS. 8 to 11. Like in the step shown in FIG. 8, a layer for forming the first material layers 111 is deposited to cover the top and both sides of the main magnetic pole 110 formed by plating. Then, the first material layers 111 are formed by etching such as RIE or the like so that the track width dimension gradually decreases in the upward direction, as shown in FIG. 9. Furthermore, as shown in FIG. 10, the second material layer 112 is deposited, and then planarized by a polishing process such as CMP to form a planarized surface and expose the upper surface 110a of the main magnetic pole 110, as show in FIG. 11.

Figure 18:
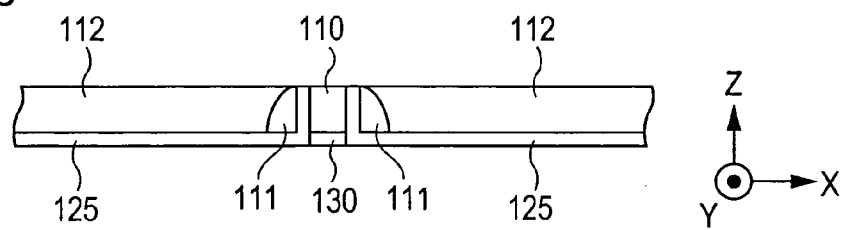
FIG. 18 is a partial front view showing an example of the magnetic heads shown in FIGS. 1 and 14.
Figure 19:
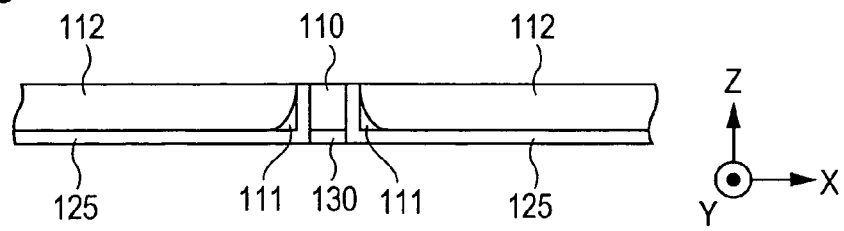
FIG. 19 is a partial front view showing another example of the magnetic heads shown in FIGS. 1 and 14.
Figure 20:
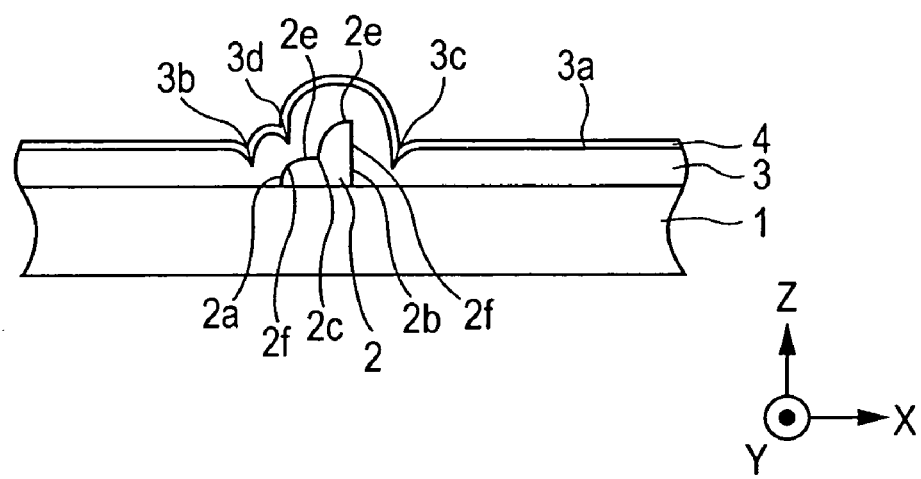
FIG. 20 is a drawing showing a step of a conventional method for manufacturing a magnetic head.
Figure 21:
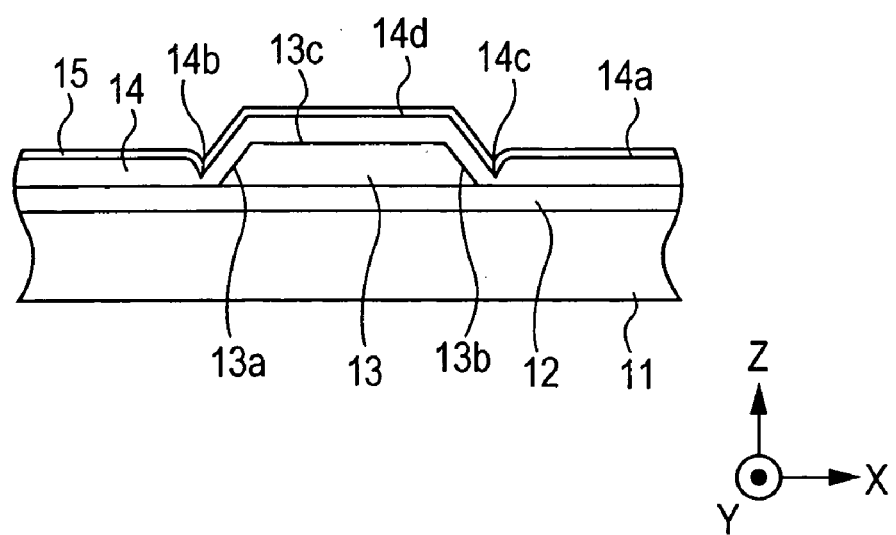
FIG. 21 is a drawing showing a step of a conventional method for manufacturing a magnetic head.
Figure 22:
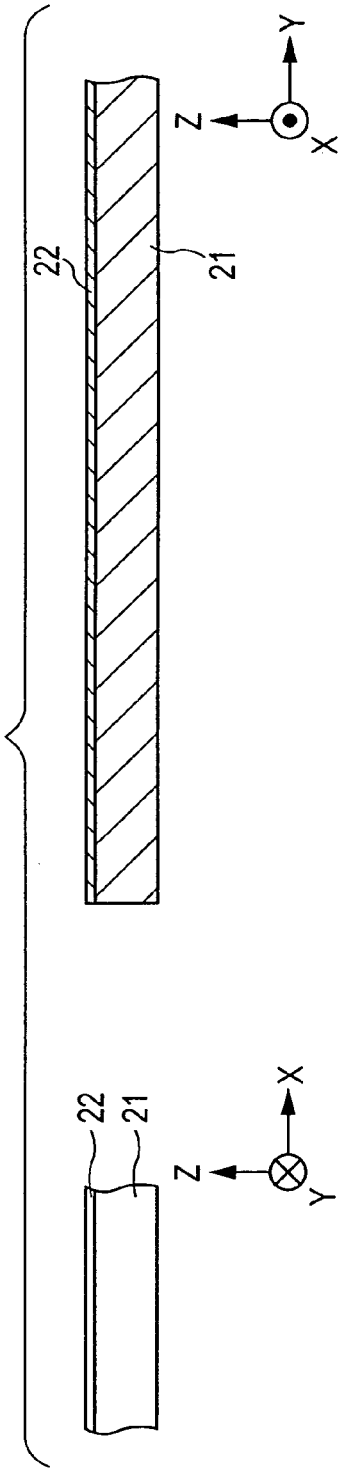
FIG. 22 is a drawing showing a step of a conventional method for manufacturing a magnetic head.
Figure 23:
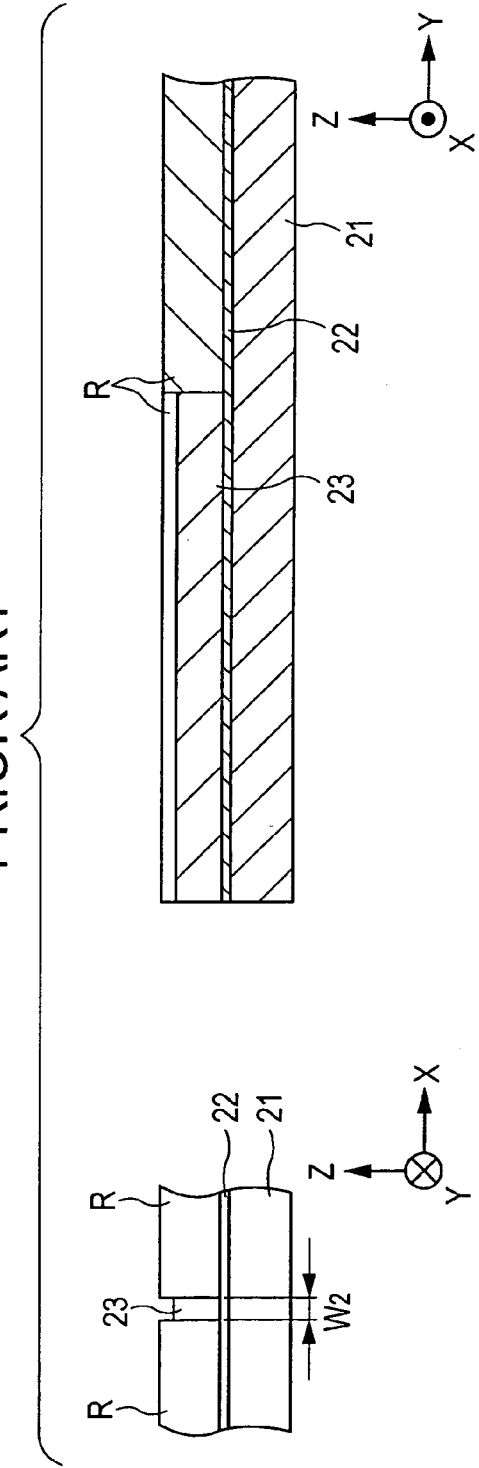
FIG. 23 is a drawing showing a step after the step shown in FIG. 22.
Figure 24:
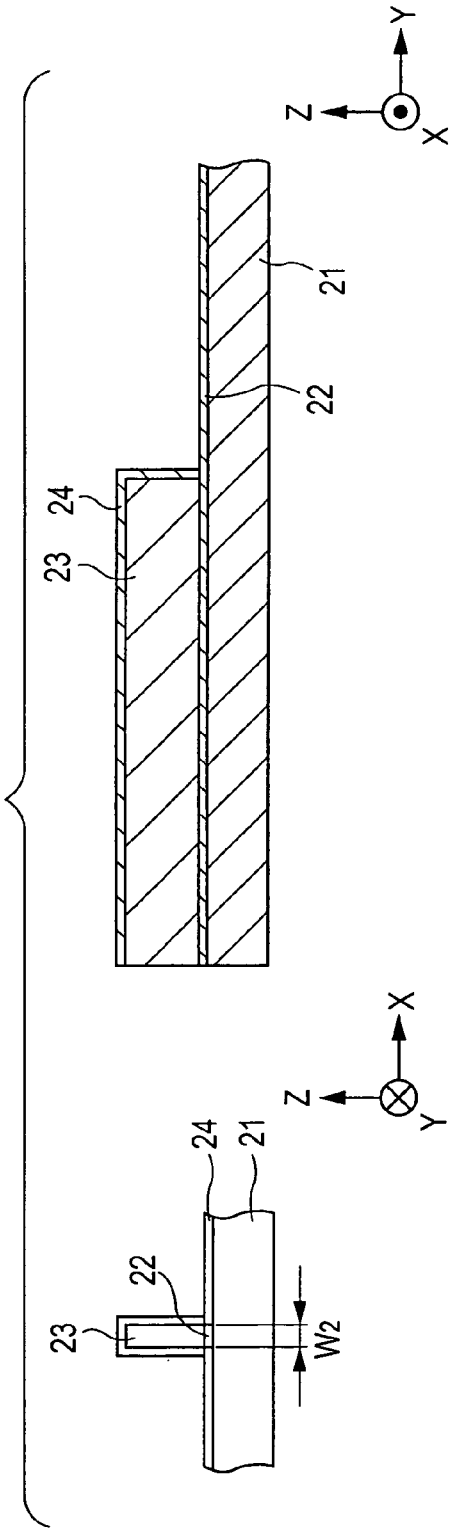
FIG. 24 is a drawing showing a step after the step shown in FIG. 23.

In the magnetic head H1 shown in FIG. 2 and the magnetic head H2 shown in FIG. 15, each first material layer 111 has a tapered structure in which the width dimension in the track width direction gradually decreases in the upward direction. However, the present invention is not limited to this structure, and the shape of the first material layers is not particularly limited as long as is can securely function as a layer for raising the second material layer 112 during the deposition of the second material layer 112. For example, as shown in FIG. 18, the first material layers 111 may be formed in a circular-arc shape curved outward in the track width direction. Alternatively, as shown in FIG. 19, the first material layers 111 may be formed in a circular arc shape curved inward in the track width direction.

The first material layers in a circular arc shape curved outward in the track width direction as shown in FIG. 18 can be formed by controlling the conditions such as the gas pressure, energy density, bias, and the like in anisotropic etching such as RIE. The first material layers in a circular arc shape curved inward in the track width direction as shown in FIG. 19 can also be formed by controlling the conditions such as the gas pressure, energy density, bias, and the like in anisotropic etching such as RIE.

In the present invention, a coil layer may be formed in a spiral shape wound around the connecting portion 117b or the connecting layer 225 for connecting the main magnetic pole 110 to the return path layer 117 or 216.

Although the present invention is described above with reference to the preferred embodiments, various changes can be made within the scope of the present invention.

The above-mentioned embodiments are described only for the illustrative purpose, and the scope of the present invention is not limited.

What is claimed is:

1. A method for manufacturing a magnetic head comprising a first magnetic layer formed on a first magnetic layer formation surface and having a track width at a surface facing a recording medium, and a second magnetic layer having a width dimension larger than the track width, the first and second magnetic layers being disposed with a space therebetween and directly or indirectly connected together in a rear portion in a height direction, the method comprising the steps of:
 (a) forming the first magnetic layer on the first magnetic layer formation surface;
 (b) forming a first material layer-forming layer over the first magnetic layer formation surface and the first magnetic layer;
 (c) partially removing the first material layer-forming layer so that first material layers are disposed to cover the respective boundaries between a top of the first magnetic layer formation surface and sides of first magnetic layer, and the width dimension of each first material layer in a track width direction gradually decreases in an upward direction;
 (d) forming a second material layer over the first magnetic layer formation surface, the first material layers, and the first magnetic layer;
 (e) polishing the first and second material layers and the first magnetic layer to expose an upper surface of the first magnetic layer and form upper surfaces of the second material layer and the first magnetic layer as the same planarized surface; and
 (f) forming a coil layer above or below the first magnetic layer.

2. The method for manufacturing the magnetic head according to claim 1, wherein in the step (c), the first material layers are formed in a tapered shape in which the width dimension decreases.

3. The method for manufacturing the magnetic head according to claim 1, wherein in the step (e), upper surfaces of the first material layers and the first magnetic layer are formed as the same planarized surface.

4. The method for manufacturing the magnetic head according to claim 1, wherein in the step (e), polishing is finished using the first material layers as a polishing stopper.

5. The method for manufacturing the magnetic head according to claim 1, wherein in the step (d), the second material layer is formed using a material having a higher polishing rate than that of the first material layers.

6. The method for manufacturing the magnetic head according to claim 5, wherein the first material layers comprise at least one of $SiO_2$, Al—Si—O, Ti, W, and Cr, and the second material layer comprises $Al_2O_3$.

7. The method for manufacturing the magnetic head according to claim 5, wherein the first material layers comprise at least one of Ti, W, and Cr, and the second material layer comprises one or both of $SiO_2$ and Al—Si—O.

8. The method for manufacturing the magnetic head according to claim 1, wherein a third material layer is formed over the first magnetic layer formation surface and the first magnetic layer between the steps (a) and (b), and in the step (b), the first material layer-forming layer is formed over the first magnetic layer formation surface and the first magnetic layer with the third material layer provided therebetween.

* * * * *